(12) United States Patent
Azarian Yazdi et al.

(10) Patent No.: US 11,005,621 B2
(45) Date of Patent: *May 11, 2021

(54) HYBRID AUTOMATIC REPEAT/REQUEST (HARQ) SCHEDULING

(71) Applicant: QUALCOMM Incorporated, San Diego, CA (US)

(72) Inventors: Kambiz Azarian Yazdi, San Diego, CA (US); Tingfang Ji, San Diego, CA (US); Jing Jiang, San Diego, CA (US); Peter Pui Lok Ang, San Diego, CA (US); Joseph Binamira Soriaga, San Diego, CA (US); Krishna Kiran Mukkavilli, San Diego, CA (US); Naga Bhushan, San Diego, CA (US); John Edward Smee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/144,859

(22) Filed: Sep. 27, 2018

(65) Prior Publication Data

US 2019/0036663 A1 Jan. 31, 2019

Related U.S. Application Data

(63) Continuation of application No. 14/808,865, filed on Jul. 24, 2015, now Pat. No. 10,291,372.

(Continued)

(51) Int. Cl.
*H04L 5/00* (2006.01)
*H04L 1/18* (2006.01)
(Continued)

(52) U.S. Cl.
CPC ......... *H04L 5/0048* (2013.01); *H04B 17/345* (2015.01); *H04L 1/0002* (2013.01);
(Continued)

(58) Field of Classification Search
CPC . H04L 5/0048; H04L 317/345; H04L 1/0002; H04L 1/002; H04L 1/1671;
(Continued)

(56) References Cited

U.S. PATENT DOCUMENTS 8,392,781 B2   3/2013  Batra et al.
8,446,870 B2 *  5/2013  Nakao ................... H04L 5/0094
                                                    370/329

(Continued)

FOREIGN PATENT DOCUMENTS

CN    101965022 A    2/2011
CN    102246445 A    11/2011
(Continued)

OTHER PUBLICATIONS

European Search Report—EP19150065—Search Authority—The Hague—dated Apr. 1, 2019.

(Continued)

*Primary Examiner* — Zhensheng Zhang
(74) *Attorney, Agent, or Firm* — Arent Fox, LLP

(57) ABSTRACT

Various aspects described herein relate to communicating hybrid automatic repeat/request (HARQ) feedback. A HARQ communication can be received over a set of one or more links based on a first scheduling grant. HARQ feedback for the HARQ communication including at least one of HARQ feedback for one or more of the set of one or more links can be transmitted.

30 Claims, 14 Drawing Sheets

Related U.S. Application Data

(60) Provisional application No. 62/074,551, filed on Nov. 3, 2014, provisional application No. 62/074,603, filed on Nov. 3, 2014, provisional application No. 62/074,618, filed on Nov. 3, 2014, provisional application No. 62/074,627, filed on Nov. 3, 2014.

(51) Int. Cl.

| | | |
|---|---|---|
| *H04L 1/00* | (2006.01) | |
| *H04L 1/16* | (2006.01) | |
| *H04L 1/20* | (2006.01) | |
| *H04W 72/08* | (2009.01) | |
| *H04B 17/345* | (2015.01) | |
| *H04B 17/373* | (2015.01) | |

(52) U.S. Cl.
CPC ............ *H04L 1/002* (2013.01); *H04L 1/1671* (2013.01); *H04L 1/189* (2013.01); *H04L 1/1812* (2013.01); *H04L 1/1825* (2013.01); *H04L 1/1887* (2013.01); *H04L 1/20* (2013.01); *H04L 5/0044* (2013.01); *H04L 5/0055* (2013.01); *H04L 5/0062* (2013.01); *H04W 72/082* (2013.01); *H04B 17/373* (2015.01)

(58) Field of Classification Search
CPC ... H04L 1/1812; H04L 1/1825; H04L 1/1854; H04L 1/1861; H04L 1/1887; H04L 1/189; H04L 1/20; H04L 5/0007; H04L 5/0044; H04L 5/0055; H04L 5/0062; H04B 7/345; H04B 17/373; H04B 17/345; H04W 72/082
See application file for complete search history.

(56) References Cited

U.S. PATENT DOCUMENTS

| | | | |
|---|---|---|---|
| 8,619,795 B2 | 12/2013 | Yu et al. | |
| 8,799,733 B2 | 8/2014 | Kim et al. | |
| 8,817,679 B2 | 8/2014 | Isojima | |
| 8,824,979 B2 | 9/2014 | Yavuz et al. | |
| 8,855,253 B2 | 10/2014 | Kalyanasundaram et al. | |
| 8,879,447 B1 | 11/2014 | Makhlouf et al. | |
| 8,892,976 B2 | 11/2014 | Graumann | |
| 9,107,174 B2 | 8/2015 | Senarath et al. | |
| 9,258,086 B2 | 2/2016 | Chen et al. | |
| 2001/0014091 A1 | 8/2001 | Yamada et al. | |
| 2005/0069029 A1 | 3/2005 | Afzal | |
| 2008/0310356 A1 | 12/2008 | Cai et al. | |
| 2009/0083601 A1* | 3/2009 | Gorokhov | H04L 1/0002 714/748 |
| 2010/0014616 A1 | 1/2010 | Coulson | |
| 2010/0083067 A1 | 4/2010 | Fujimoto et al. | |
| 2010/0195752 A1 | 8/2010 | Lee et al. | |
| 2010/0316096 A1 | 12/2010 | Adjakple et al. | |
| 2011/0039547 A1 | 2/2011 | Van et al. | |
| 2011/0249569 A1 | 10/2011 | Mashino et al. | |
| 2011/0310820 A1* | 12/2011 | Liao | H04L 1/1614 370/329 |
| 2012/0039284 A1 | 2/2012 | Barbieri et al. | |
| 2012/0057547 A1 | 3/2012 | Loehr et al. | |
| 2012/0057560 A1 | 3/2012 | Park et al. | |
| 2012/0099553 A1 | 4/2012 | Aiba et al. | |
| 2012/0113946 A1 | 5/2012 | Seo et al. | |
| 2012/0134305 A1 | 5/2012 | Damnjanovic et al. | |
| 2012/0155403 A1 | 6/2012 | Lee | |
| 2013/0051272 A1 | 2/2013 | Wiberg et al. | |
| 2013/0182569 A1 | 7/2013 | Bertrand et al. | |
| 2013/0223485 A1 | 8/2013 | Bai et al. | |
| 2014/0024388 A1 | 1/2014 | Earnshaw et al. | |
| 2014/0112373 A1 | 4/2014 | Ro et al. | |
| 2014/0211644 A1* | 7/2014 | Giannakis | H04W 16/14 370/252 |
| 2014/0233481 A1 | 8/2014 | Feng et al. | |
| 2015/0215082 A1 | 7/2015 | Agiwal et al. | |
| 2016/0128090 A1 | 5/2016 | Azarian et al. | |
| 2016/0128091 A1 | 5/2016 | Azarian et al. | |
| 2016/0128092 A1 | 5/2016 | Azarian et al. | |

FOREIGN PATENT DOCUMENTS

| | | |
|---|---|---|
| CN | 102340385 A | 2/2012 |
| CN | 102349342 A | 2/2012 |
| CN | 103313254 A | 9/2013 |
| CN | 103348620 A | 10/2013 |
| CN | 103532683 A | 1/2014 |
| CN | 103782639 A | 5/2014 |
| EP | 1 853 006 A2 | 11/2007 |
| JP | 2005184809 A | 7/2005 |
| JP | 2012120182 A | 6/2012 |
| WO | 2008120275 A1 | 10/2008 |
| WO | 2009039404 A2 | 3/2009 |
| WO | 2013020012 A1 | 2/2013 |
| WO | WO-2013/044985 A1 | 4/2013 |
| WO | 2014038863 A1 | 3/2014 |

OTHER PUBLICATIONS

Qualcomm Incorporated: HARQ Design for URLLC [online], 3GPP TSG RAN WG1 #87 R1-1612079, Internet http://www.3gpp.org/ftp/tsg_ran/WG1_RL1/TSGR1_87/Docs/R1-1612079.zip , Nov. 18, 2016, pp. 1-7.

European Search Report—EP18175755—Search Authority—The Hague—dated Aug. 22, 2018 7 pages.

Hueda M.R. et al., "Enhanced-Performance Video Transmission in Multicode Coma Wireless Systems Using A Feedback Error Control Scheme", GLOBECOM '01, IEEE Global Telecommunications Conference, San Antonio, Texas, USA, Nov. 25-29, 2001, IEEE Operations Center, Piscataway, NJ, Nov. 25, 2001 (Nov. 25, 2001), pp. 619-626, XP001090329, DOI: 10.1109/Glocom.2001.965191, ISBN: 978-0-7803-7206-1.

International Search Report and Written Opinion—PCT/US2015/052668—ISA/EPO—dated Dec. 7, 2015 12 pages.

Lee J., et al., "Design of an Error Control Scheme for Hard Real-Time Communication on FDDI Networks", Proceedings of IEEE Tencon'99, IEEE Region 10 Conference, Multimedia Technology for Asia-Pacific Information Infrastructure, The Silla Cheju, Cheju Island, Korea, Sep. 15-17, 1999, [IEEE Region 10 Annual Conference], New York, NY, IEEE, US, Sep. 15, 1999 (Sep. 15, 1999), pp. 828-831, XP000956507, ISBN: 978-0-7803-5740-2.

Sheu S-T., et al., "A Bandwidth Allocation/Sharing/Extension Protocol for Multimedia Over IEEE 802.11 Ad Hoc Wireless LANs", IEEE Journal on Selected Areas in Communications, IEEE Service Center, Piscataway, US, vol. 19, No. 10, Oct. 1, 2001 (Oct. 1, 2001), pp. 2065-2080, XP011055475, ISSN: 0733-8716.

* cited by examiner

HYBRID AUTOMATIC REPEAT/REQUEST (HARQ) SCHEDULING

CLAIM OF PRIORITY UNDER 35 U.S.C. § 119

The present Application for patent claims is a continuation of application Ser. No. 14/808,865 entitled "HYBRID AUTOMATIC REPEAT/REQUEST (HARQ) SCHEDULING" filed Jul. 24, 2015, which claims priority to Provisional Application No. 62/074,551 entitled "PROACTIVE MANAGEMENT OF A HIGH RELIABILITY LOW LATENCY MISSION CRITICAL COMMUNICATION" filed Nov. 3, 2014, Provisional Application No. 62/074,603 entitled "HYBRID AUTOMATIC REPEAT/REQUEST (HARQ) FOR HIGH RELIABILITY LOW LATENCY (HRLL) WIRELESS COMMUNICATIONS" filed Nov. 3, 2014, Provisional Application No. 62/074,618 entitled "HYBRID AUTOMATIC REPEAT/REQUEST (HARQ) FOR HIGH RELIABILITY LOW LATENCY (HRLL) WIRELESS COMMUNICATIONS" filed Nov. 3, 2014, and Provisional Application No. 62/074,627 entitled "HYBRID AUTOMATIC REPEAT/REQUEST (HARQ) FOR HIGH RELIABILITY LOW LATENCY (HRLL) WIRELESS COMMUNICATIONS" filed Nov. 3, 2014, which are assigned to the assignee hereof and hereby expressly incorporated by reference herein.

BACKGROUND

Described herein are aspects generally related to communication systems, and more particularly, to transmitting hybrid automatic repeat/request (HARQ) communications in communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). These multiple access technologies have been adopted in various telecommunications standards to provide a common protocol that enables different wireless devices to communicate on a municipal, national, regional, and even global level.

An example of a telecommunications standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology.

In wireless communications systems employing LTE, a user equipment (UE) served by one or more evolved Node Bs (eNBs) can communicate using HARQ communications. The HARQ communications may indicate to the UE whether communications are received, and accordingly the UE can schedule retransmission of communications that are not received.

With development of lower latency communications, a shorter transmission time interval (TTI) (e.g., a TTI less than the 1 millisecond TTI of LTE) is supported. In addition, high reliability low latency (HRLL) communications are being developed for "mission critical" applications, which demand very low error rates (e.g., 1e-4 or less) along with the low round trip times (e.g., 500 microsecond or less) characteristic of the lower latency communications. Enhancements to current HARQ mechanisms may be needed to support the high levels of reliability demanded by the mission critical applications along with the low latency of HRLL communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating hybrid automatic repeat/request (HARQ) feedback is provided. The method includes receiving a HARQ communication over a set of one or more links based on a first scheduling grant, and transmitting HARQ feedback for the HARQ communication including at least one of HARQ feedback for one or more of the set of one or more links.

In another example, an apparatus for communicating HARQ feedback is provided. The apparatus includes a memory, and at least one processor coupled to the memory. The at least one processor is configured to receive a HARQ communication over a set of one or more links based on a first scheduling grant, and transmit HARQ feedback for the HARQ communication including at least one of HARQ feedback for one or more of the set of one or more links.

In yet another example, an apparatus for communicating HARQ is provided. The apparatus includes means for receiving a HARQ communication over a set of one or more links based on a first scheduling grant, and means for transmitting HARQ feedback for the HARQ communication including at least one of HARQ feedback for one or more of the set of one or more links.

In another example, a computer-readable storage medium comprising computer-executable code for communicating HARQ feedback is provided. The code includes code for receiving a HARQ communication over a set of one or more links based on a first scheduling grant, and code for transmitting HARQ feedback for the HARQ communication including at least one of HARQ feedback for one or more of the set of one or more links.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
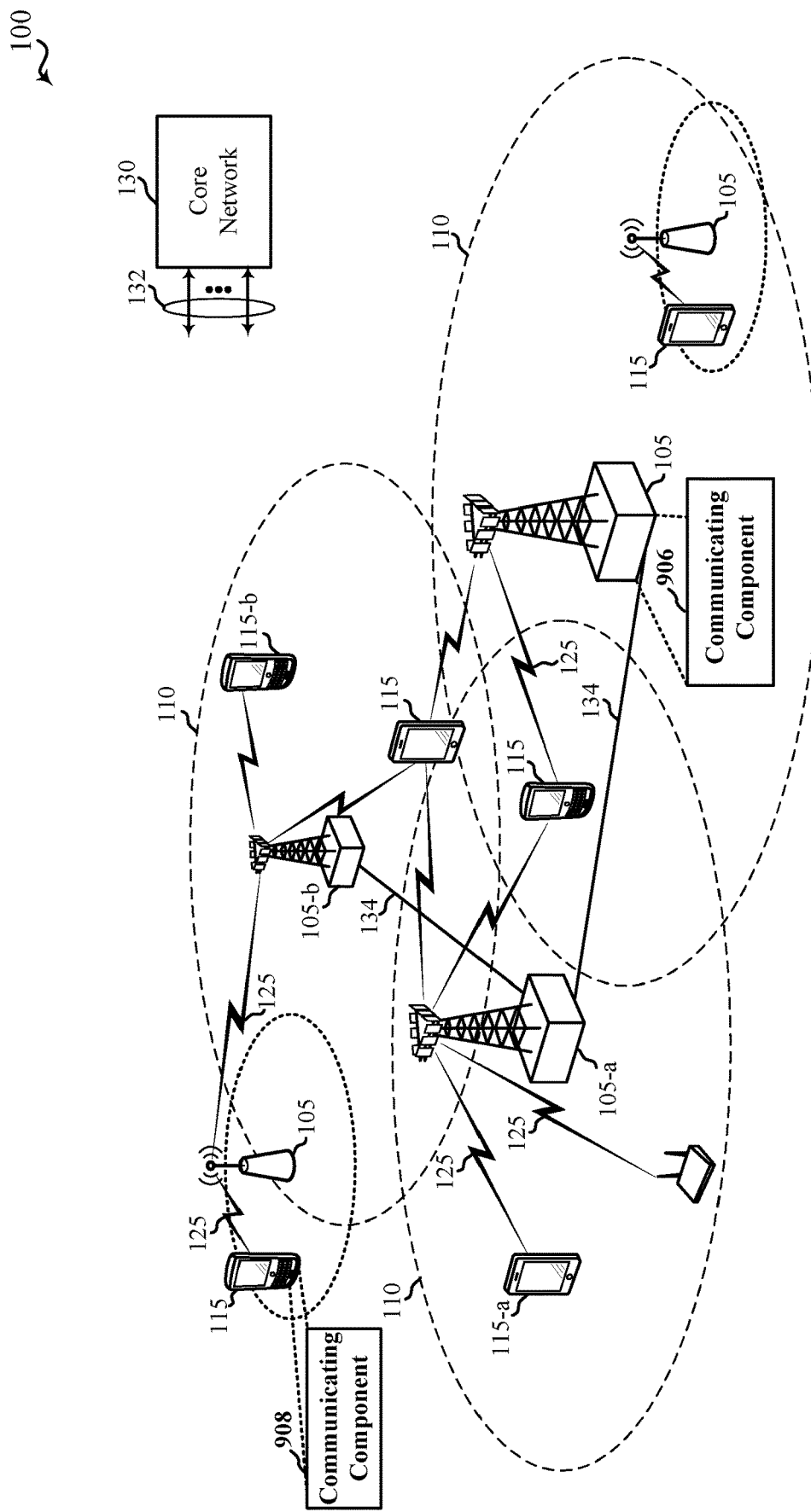
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to providing hybrid automatic repeat/request (HARQ) with improved reliability for low latency wireless communications (e.g., high reliability low latency (HRLL) communications for supporting mission critical or other high priority applications). For example, with regard to aspects of a HARQ air interface, user equipment (UE) can be scheduled on multiple links or different links with a network for different HARQ communications to improve a likelihood of receiving the HARQ communications. In another example, with regard to aspects of a HARQ air interface, the UE can be scheduled for varying bandwidths on each link for different HARQ transmissions.

Moreover, with regard to aspects of HARQ receiver-side and scheduler-side procedures, links with multi-modal capacity probability density functions (PDF) can be managed by operation of multiple channel quality indicator (CQI) loops, which may exist per link and per interference pattern(s) observed on each link. For example, an interference pattern can relate to one or more neighboring cells from which interference is detected for a HARQ communication in a given TTI or other period of time. In addition, with regard to aspects of HARQ receiver-side and scheduler-side procedures, alternative acknowledgement (ACK)/negative-acknowledgement (NACK) formats can be supported for improved rate-control loop at low block error rates (BLER). The alternative ACK/NACK formats may include reporting current and predicted interference over one or more links in order to determine a link configuration for the HARQ communications to achieve a desired BLER.

It is to be appreciated that the terms "low latency wireless communications" or "lower latency communications" as used herein, whether in the context of ultra low latency (ULL) communications (also referred to as very low latency (VLL) communications), HRLL communications, high reliability, medium latency (HRML) communications, etc., can refer to communications that utilize a transmission time interval (TTI) that is less than that of an underlying communication technology relating to the lower latency communications. For example, in lower latency communications relating to LTE, the lower latency communications use a TTI that, in one aspect, is less than the 1 subframe TTI in duration in LTE, or, in other words, is less than 1 millisecond (ms) in duration. Further, for example in one aspect, such lower latency communications may use a TTI having a duration with a value of one symbol (e.g., one orthogonal frequency division multiplexing (OFDM) symbol in LTE), two symbols, etc. In another aspect, the lower latency communications may use a TTI having a duration with a value of one slot, where each slot can include a number of symbols that typically form one half of a subframe, and/or the like.

Also, it should be noted that the term "thin TTI" as used in this disclosure refers to a TTI having a duration less than that of an underlying communication technology relating to the lower latency communications. In addition, in some configurations, such lower latency communications can be superimposed or punctured over communications for the underlying communication technologies (e.g., over LTE in the above example). Moreover, in this regard, some network nodes may support both communications using the underlying communication technology and the lower latency communications using different TTIs. In some cases, this may include supporting both over the same or similar frequency resources.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a communicating component 906 configured to communicate resource grants (e.g., for control and/or data uplink communications) to UEs 115. For example, the communicating component 906 can be configured to communicate resource grants for HARQ in lower latency communications in certain configurations, for example but not limited to configuration 600 (FIG. 6), configuration 700 (FIG. 7), configuration 800 (FIG. 8), etc. Similarly, one or more of UEs 115 may include a communicating component 908 configured to receive, decode, transmit, and operate using the same configurations (e.g., based on resource grants received from access point 105).

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links.

The wireless communications system 100 may support operation on multiple carriers (waveform signals of different frequencies). Multi-carrier transmitters can transmit modulated signals simultaneously on the multiple carriers. For example, each communication link 125 may carry multi-carrier signals modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, UE 115 can be configured with at least one primary cell (PCell) configured to support uplink and downlink communications between UE 115 and an access point 105. It is to be appreciated that there can be a PCell for each communication link 125 between a UE 115 and a given access point 105. In addition, each of the communication links 125 can have one or more secondary cells (SCells) that can support uplink and/or downlink communications as well. In some examples, the PCell can be used to communicate at least a control channel, and the SCell can be used to communicate a data channel. In one example, the PCell and/or SCell can configure one or more enhanced component carriers (eCC) that provide lower latency communications (e.g., based on configuration 600 (FIG. 6), configuration 700 (FIG. 7), configuration 800 (FIG. 8), etc.), as described further herein.

In some examples, one or more of the access points 105 may support a lower latency communication technology and/or an underlying communication technology upon which the lower latency communication technology is based. For example, an access point 105 may support one or more of LTE, or ULL/HRLL/HRML. Where an access point 105 supports both LTE and one or more lower latency communication technologies (e.g., ULL, HRLL, or HRML), the access point 105 may communicate using the lower latency communication technology within subframes of LTE. In one example, the access point 105 may communicate by at least one of using the one or more lower latency communication technologies over different frequency bands than LTE, using the one or more lower latency communication technologies over different subframes that may be blanked for LTE communications in favor of the lower latency communications, and/or puncturing LTE communications with lower latency communications, etc.

As used herein, "blanking" can refer to refraining from utilizing transmission resources of a device (e.g., access point 105, UE 115, etc.) to transmit signals over a period of time. In the above example, the device can refrain from using transmission resources for LTE in certain subframes to facilitate improved lower latency wireless communications. As also used herein, "puncturing" can refer to selecting a portion of a communication of one technology, such as one or more symbols, over which communications of another technology are transmitted. Puncturing can be similar to blanking in that transmission resources of a device are refrained from being utilized. However, puncturing can be applied at one or more frequency resources over a period of time, as opposed to all transmissions over the period of time as in blanking. In the above example, the device may puncture certain LTE resources, and lower latency wireless communications can be transmitted over the punctured LTE resources.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, evolved Node B (eNB), Home NodeB, a Home eNB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RATs). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms eNB (or eNodeB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul link 132 (e.g., Si interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, an appliance, an entertainment device, an automobile, or the like. A UE 115 may be able to communicate with macro eNBs, small cell eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each of multiple hierarchical layers which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

Each of the different operating modes that may be employed by wireless communication system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In other examples, different communication technologies may operate according to different TDD or FDD modes (e.g., LTE according to FDD and lower latency communications according to TDD or vice versa), etc. In some examples, OFDMA communications signals may be used in the communication links 125 for LTE downlink transmissions for each hierarchical layer and/or communication technology, while single carrier frequency division multiple access (SC-FDMA) communications signals may be used in the communication links 125 for LTE uplink transmissions in each hierarchical layer and/or communication technology. Additional details regarding implementation of multiple communication technologies (e.g., a lower latency communication technology and a related underlying communication technology) in a system such as the wireless communications system 100, as well as other features and functions related to communications in such systems, are provided below with reference to the following figures.

Figure 2:
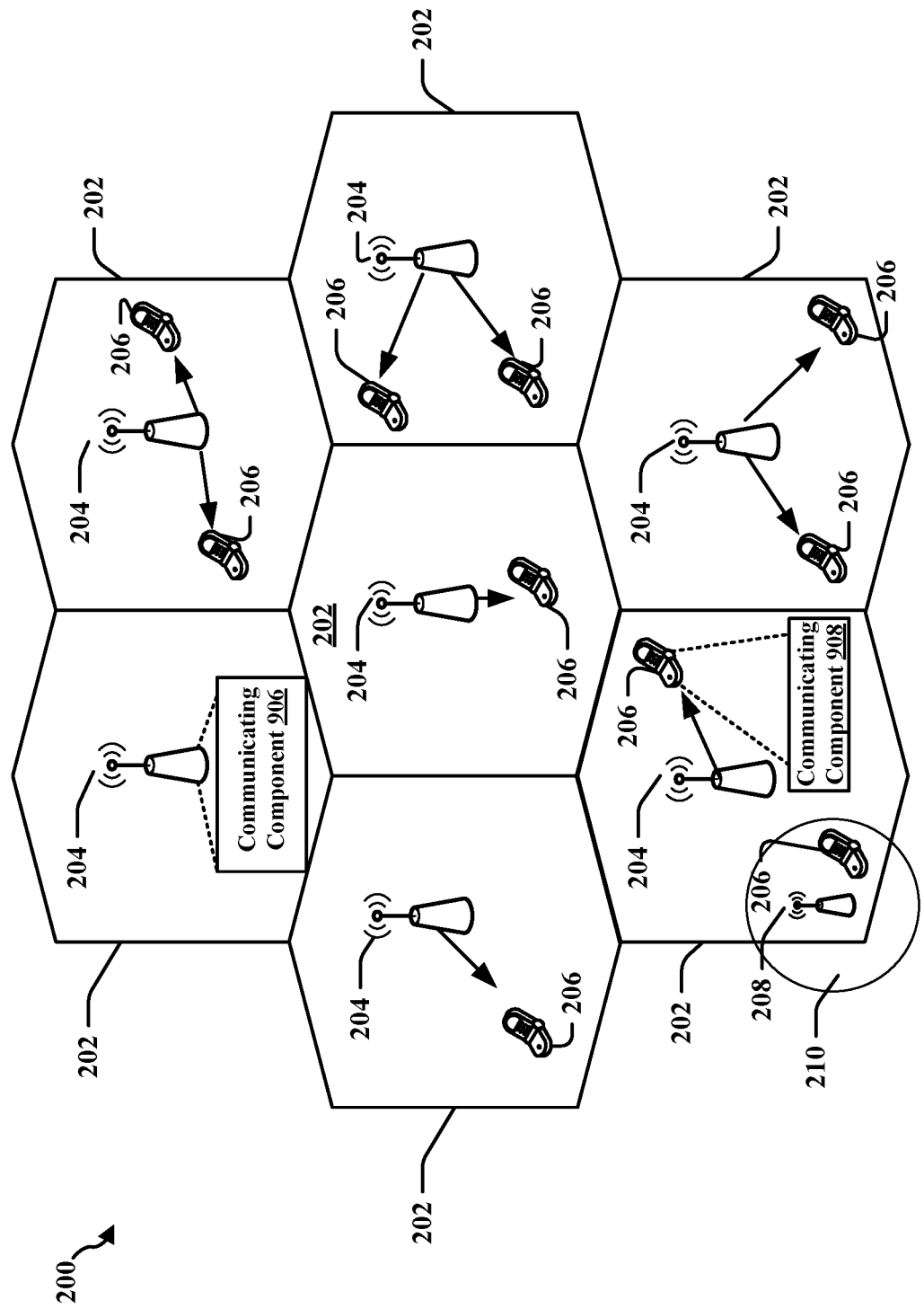
FIG. 2 is a diagram illustrating an example of an access network.

FIG. 2 is a diagram illustrating an example of an access network 200 in an LTE network architecture that may also include devices having communicating component 906 and communicating component 908, and the corresponding ULL and/or HRLL communication configurations, as described herein. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202.

In an aspect, eNBs 204 may include a communicating component 906 configured to communicate resource grants to UEs 206 for HARQ in lower latency communications in certain configurations, for example but not limited to configuration 600 (FIG. 6), configuration 700 (FIG. 7), configuration 800 (FIG. 8), etc. Similarly, one or more of UEs 206 may include a communicating component 908 configured to receive, decode, transmit, and operate using the frame structure (e.g., based on resource grants received from one or more eNBs 204. There is no centralized controller shown in this example of an access network 200, but a centralized controller may be used in alternative configurations. The eNBs 204 are responsible for all radio related functions including radio bearer control, admission control, mobility control, scheduling, security, and connectivity functions associated with the serving gateway 116.

The modulation and multiple access scheme employed by the access network 200 may vary depending on the particular telecommunications standard being deployed. Examples of multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 may transmit a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
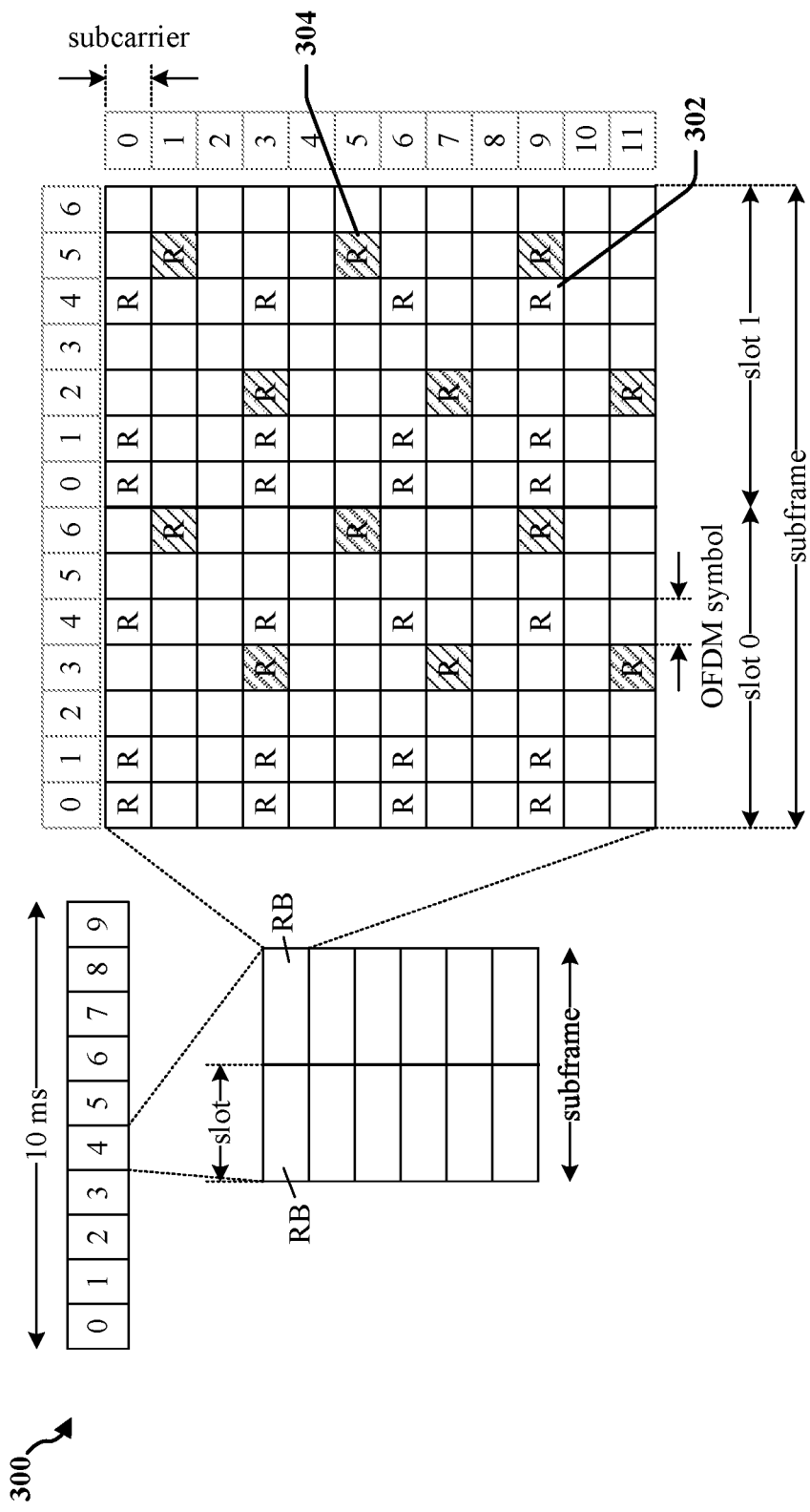
FIG. 3 is a diagram illustrating an example of a downlink (DL) frame structure in long term evolution (LTE).

FIG. 3 is a diagram 300 illustrating an example of a DL frame structure in LTE that may be used in conjunction with the ULL and/or HRLL communication configurations between an eNB and a user equipment, as described in this disclosure. A frame (10 ms) may be divided into 10 equally sized sub-frames, where a subframe can correspond to a TTI in LTE. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements.

As described, TTIs for a lower latency communication technology based on LTE as an underlying communication technology can be of one symbol, two symbols, one slot, etc. in duration (or some other duration less than a subframe in length). Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
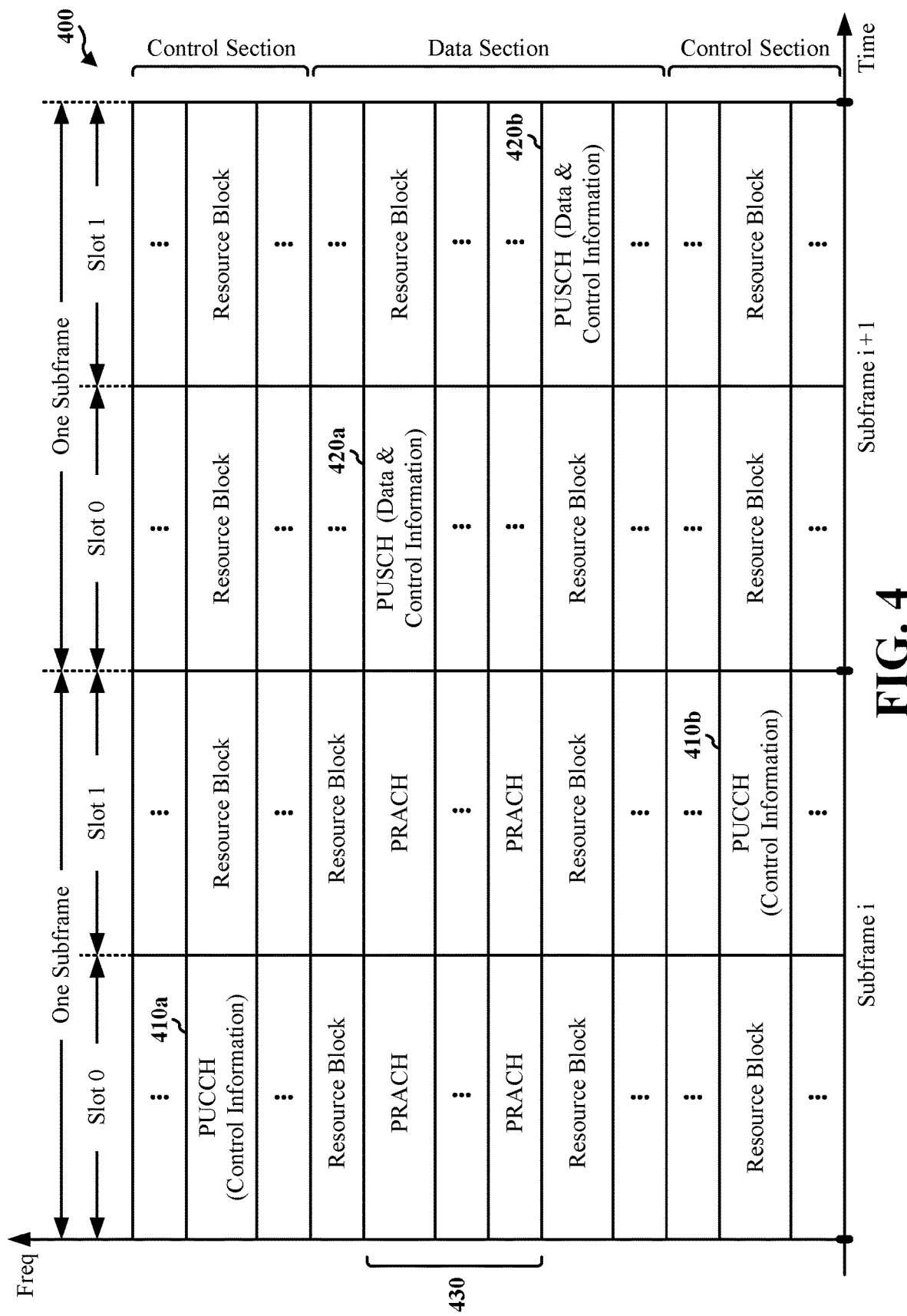
FIG. 4 is a diagram illustrating an example of an uplink (UL) frame structure in LTE.

FIG. 4 is a diagram 400 illustrating an example of an UL frame structure in LTE, which, in some examples, may be utilized in conjunction with the ULL or HRLL/HRML communication configurations described herein. For example, subframes having two slots are depicted, and each slot may have a number of symbols, as described above. Thus, ULL or HRLL/HRML UL communications may use a TTI that is one symbol, two symbols, one slot, etc. in duration. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

In one example, a UE may be assigned resource element blocks 410*a*, 410*b* in the control section to transmit control information to an eNB. The UE may also be assigned resource element blocks 420*a*, 420*b* in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
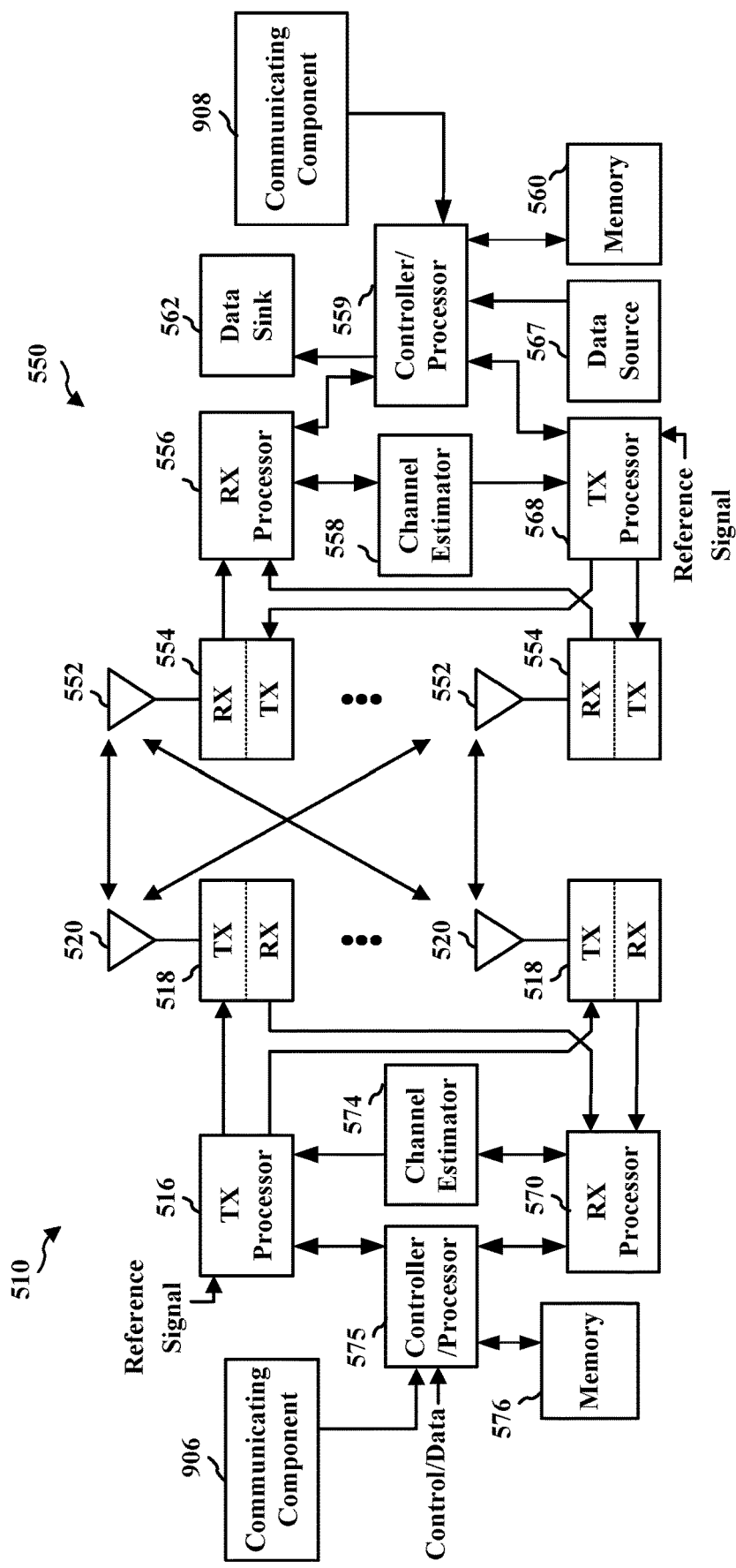
FIG. 5 is a diagram illustrating an example of an evolved Node B and user equipment in an access network.

FIG. 5 is a block diagram of an eNB 510 in communication with a UE 550 in an access network, including the communicating component 906, communicating component 908, and communication configurations described herein. In the DL, upper layer packets from the core network are provided to a controller/processor 575. The controller/processor 575 implements the functionality of the L2 layer. In the DL, the controller/processor 575 provides header compression, ciphering, packet segmentation and reordering, multiplexing between logical and transport channels, and radio resource allocations to the UE 550 based on various priority metrics. The controller/processor 575 is also responsible for HARQ operations, retransmission of lost packets, and signaling to the UE 550.

The transmit (TX) processor 516 implements various signal processing functions for the L1 layer (i.e., physical layer). The signal processing functions includes coding and interleaving to facilitate forward error correction (FEC) at the UE 550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream is then provided to a different antenna 520 via a separate transmitter 518TX. Each transmitter 518TX modulates an RF carrier with a respective spatial stream for transmission. In addition, eNB 510 may include a communicating component 906 configured to communicate resource grants to UE 550 for HARQ in lower latency communications in certain configurations, for example but not limited to configuration 600 (FIG. 6), configuration 700 (FIG. 7), configuration 800 (FIG. 8), etc. For example, communicating component 906 may be coupled to and/or may be implemented by one or more processors, such as controller/processor 575 (as shown), TX processor 516, RX processor 570, etc. Thus, for example, the one or more processors may execute one or more of the Blocks in methods 1000, 1100, 1200, 1300. In addition, in an example, the communicating component 906 may interface with one or more transmitter/receivers 518 to transmit resource grants and/or related communications over the resource grants with one or more UEs 550, and/or perform other operations, such as Blocks in methods 1000, 1100, 1200, 1300, etc.

At the UE 550, each receiver 554RX receives a signal through its respective antenna 552. Each receiver 554RX recovers information modulated onto an RF carrier and provides the information to the receive (RX) processor 556. The RX processor 556 implements various signal processing functions of the L1 layer. The RX processor 556 performs spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 510. These soft decisions may be based on channel estimates computed by the channel estimator 558. The soft decisions are then decoded and deinterleaved to recover the data and control signals that were originally transmitted by the eNB 510 on the physical channel. The data and control signals are then provided to the controller/processor 559.

The controller/processor 559 implements the L2 layer. The controller/processor can be associated with a memory 560 that stores program codes and data. The memory 560 may be referred to as a computer-readable medium. In the UL, the controller/processor 559 provides demultiplexing between transport and logical channels, packet reassembly, deciphering, header decompression, control signal processing to recover upper layer packets from the core network. The upper layer packets are then provided to a data sink 562, which represents all the protocol layers above the L2 layer. Various control signals may also be provided to the data sink 562 for L3 processing. The controller/processor 559 is also responsible for error detection using an acknowledgement (ACK) and/or negative acknowledgement (NACK) protocol to support HARQ operations.

In addition, UE 550 may include a communicating component 908 configured to receive, decode, transmit, and operate to communicate HARQ in lower latency communications in certain configurations, for example but not limited to configuration 600 (FIG. 6), configuration 700 (FIG. 7), configuration 800 (FIG. 8), etc. For example, communicating component 908 may be coupled to and/or may be implemented by one or more processors, such as controller/processor 559 (as shown), TX processor 568, RX processor 556, etc. Thus, for example, the one or more processors may execute one or more of the Blocks in methods 1000, 1100, 1200, 1300. In addition, in an example, the communicating component 908 may interface with one or more transmitter/receivers 554 to receive resource grants and/or related communications over the resource grants from an eNB 510, and/or perform other operations, such as Blocks in methods 1000, 1100, 1200, 1300, etc.

In the UL, a data source 567 is used to provide upper layer packets to the controller/processor 559. The data source 567 represents all protocol layers above the L2 layer. Similar to the functionality described in connection with the DL transmission by the eNB 510, the controller/processor 559 implements the L2 layer for the user plane and the control plane by providing header compression, ciphering, packet segmentation and reordering, and multiplexing between logical and transport channels based on radio resource allocations by the eNB 510. The controller/processor 559 is also responsible for HARQ operations, retransmission of lost packets, and signaling to the eNB 510.

Channel estimates derived by a channel estimator 558 from a reference signal or feedback transmitted by the eNB 510 may be used by the TX processor 568 to select the appropriate coding and modulation schemes, and to facilitate spatial processing. The spatial streams generated by the TX processor 568 are provided to different antenna 552 via separate transmitters 554TX. Each transmitter 554TX modulates an RF carrier with a respective spatial stream for transmission.

The UL transmission is processed at the eNB 510 in a manner similar to that described in connection with the receiver function at the UE 550. Each receiver 518RX receives a signal through its respective antenna 520. Each receiver 518RX recovers information modulated onto an RF carrier and provides the information to a RX processor 570. The RX processor 570 may implement the L1 layer.

The controller/processor 575 implements the L2 layer. The controller/processor 575 can be associated with a memory 576 that stores program codes and data. The memory 576 may be referred to as a computer-readable medium. In the UL, the control/processor 575 provides demultiplexing between transport and logical channels, packet reassembly, deciphering, header decompression, control signal processing to recover upper layer packets from the UE 550. Upper layer packets from the controller/processor 575 may be provided to the core network. The controller/processor 575 is also responsible for error detection using an ACK and/or NACK protocol to support HARQ operations.

Figure 6:
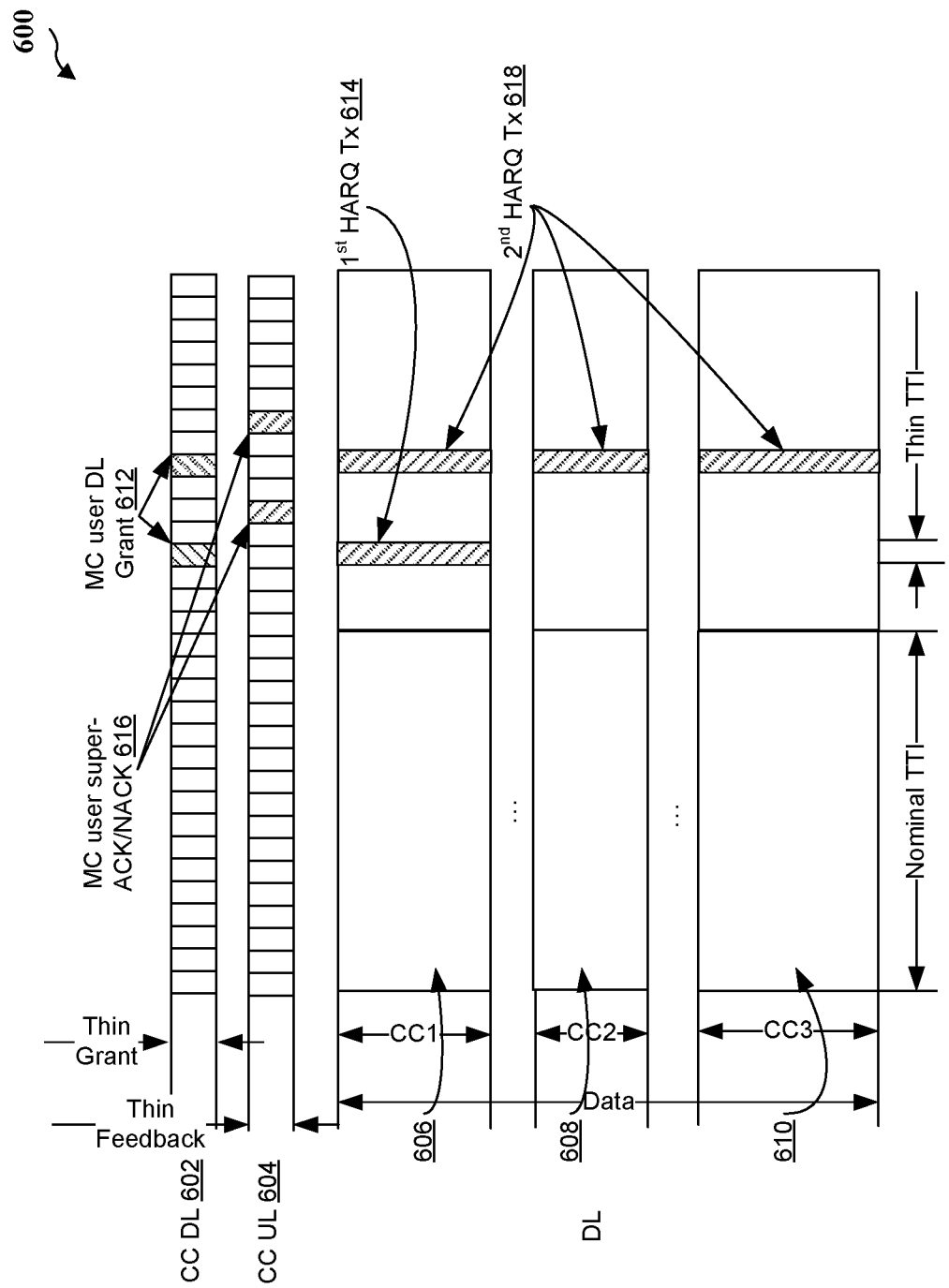
FIGS. 6-8 are example diagrams illustrating example configurations for transmitting hybrid automatic repeat/request (HARQ) communications.

FIG. 6 is a diagram illustrating a non-limiting example of a configuration 600 for scheduling HARQ in lower latency communications. For example, configuration 600 relates to an example air interface configuration for an eNB (e.g., access point 105, eNB 204, eNB 510, eNB 904, etc.) to schedule, and a UE (e.g., UE 115, UE 206, UE 550, UE 902, etc.) to receive, HARQ communications having relatively lower latency than existing HARQ communications. The lower latency HARQ communications may be due to, for example, the underlying lower latency wireless communication configuration using a TTI that is less than a subframe in duration. In addition, configuration 600 allows for more reliable HARQ communications by increasing the number of links or component carriers (CCs) utilized in communicating from the eNB to the UE after an initial HARQ communication.

It is to be appreciated that a CC can refer to a frequency carrier within a portion of bandwidth of an underlying wireless communication system used for uplink and/or downlink communications, where the CC may be aggregated with other CCs (e.g., of the same or other bandwidth) in certain examples to provide additional bandwidth for device communications. In a specific example, in LTE, a CC may be a carrier having 1.4, 3, 5, 10, 15, or 20 megahertz (MHz) bandwidth.

Configuration 600 depicts a plurality of CCs 602, 604, 606, 608, 610 that may be utilized by an eNB and a user equipment. CCs 602 (which may be referred to as a "thin grant" control channel based on its utilization of less than a subframe duration TTI) and 604 (which may be referred to as a "thin feedback" control channel) may include CCs configured to carry downlink and uplink control data, respectively. CCs 606, 608, and 610 can be configured to carry downlink data communications. One or more nominal TTIs (such as, but not limited to, one subframe in length) and thin TTIs (such as, but not limited to, less than one subframe in length, and depicted here as one symbol in length), as depicted, can be multiplexed through the two control channel CCs 602 and 604. Configuration 600 can include one or more multicarrier (MC) user downlink grants 612 transmitted over downlink CC 602 (e.g., from an eNB to a UE).

For example, an MC user can refer to a device, such as a UE, that is capable of communicating over a configuration having multiple CCs. A grant, which is also referred to herein as a resource grant, can refer to an allocation of frequency and/or time resources (e.g., one or more CCs) for a device to utilize in communicating with another device. Thus, for example, an MC user downlink grant can refer to an allocation of resources for a device, such as a UE, that are allocated by another device, such as an eNB, for communicating between the UE and eNB, where the grant can include multiple CCs in one or more periods of time. It is to be appreciated that the eNB can send an indication of the MC user downlink grant to the UE.

For example, the first MC user downlink grant 612 can be sent by an eNB to a UE capable of communicating using multiple carriers (e.g., the UE is also referred to herein as an MC user) simultaneously with a corresponding first HARQ transmission 614 (also referred to herein as a HARQ communication; or, in this case, a first instance of a HARQ communication), where the first HARQ transmission 614 is transmitted over a single CC (also referred to herein as a link). Accordingly, for example, the UE can receive the first MC user DL grant 612 and can accordingly determine to receive and/or decode the first HARQ transmission 614 over CC1 606.

A MC user super ACK/NACK 616 (also referred to herein as HARQ feedback), as described further herein, can be transmitted on the UL CC 604 in response to the first HARQ transmission 614. As described further below, the super ACK/NACK may include not only ACK/NACK feedback for a wireless communication (e.g., an ACK/NACK bit indicating whether cyclic redundancy check (CRC) for the HARQ transmission passed), but may also include additional feedback information. The additional feedback information may include, for example, one or more auxiliary ACK/NACK feedback information (e.g., one or more ACK/NACK bits) indicating feedback for a plurality of links (or CCs) between the MC user and the network (e.g., between a UE and eNB), an indication of one or more interference patterns detected by the MC user in receiving a communication from the eNB (e.g., during a last HARQ transmission), one or more interference patterns (e.g., on each link or CC) predicted for a subsequent period of time (e.g., for a next HARQ transmission), an explicit indication of links/grants to use in subsequent HARQ transmissions, information for suppressing interference from surrounding cells (e.g., or eNBs providing the cells), any other suitable feedback information, and/or any combination thereof.

Moreover, as described further herein, the eNB may use this information in determining a subsequent grant for another instance of the communication. In one example, the MC user may send the super ACK/NACK (e.g., as opposed to a conventional ACK/NACK indicator) when NACK is being sent for the communication.

In any case, in this example, the MC user super ACK/NACK 616 may indicate NACK for the first MC user grant 612 and/or the first HARQ transmission 614. In response, the eNB may send a second MC user downlink grant 612 over the downlink control CC 602 along with a second HARQ transmission 618 (also referred to as a second instance of the HARQ communication). As depicted, the second HARQ transmission 618 can be transmitted over multiple CCs 606, 608, and 610 to increase likelihood of receiving the second HARQ transmission 618 over one or more of the CCs 606, 608, and 610. This can improve reliability of communications for mission critical applications. Consequently, the first HARQ transmission 614 may be transmitted for efficiency, and the second HARQ transmission 618 may be transmitted for ultra-reliability.

Additionally, because smaller than nominal TTIs are utilized, as depicted, lower latency communications can also be supported in this regard. A second MC user super ACK/NACK 616 can be sent in response to the second HARQ transmission 618 subsequent to the first MC user super ACK/NACK 616.

As described above, the MC user super ACK/NACK 616 can include not only an ACK/NACK bit (e.g., indicating whether cyclic redundancy check (CRC) for the HARQ transmission passed), but may also include additional feedback information. Accordingly, when the first super ACK/NACK 616 is received for the first HARQ transmission 614, the eNB can determine that the CCs 606, 608, and 610 should be used for transmitting the second HARQ transmission 618 based on the information that is included in the super ACK/NACK 616. This may increase a likelihood of successful receipt of the second HARQ transmission 618. Moreover, in addition to or instead of using the super ACK/NACK information to schedule second HARQ transmission 618 on the multiple links (or CCs 606, 608, 610), the super ACK/NACK information can be used to perform at least one of: changing a grant bandwidth or duration on one or more of the links, changing a modulation order used over one or more of the links, changing a channel code rate on one or more of the links, and/or the like, as described further herein. This scheme can help to obtain a target BLER without sacrificing spectral efficiency.

Figure 7:
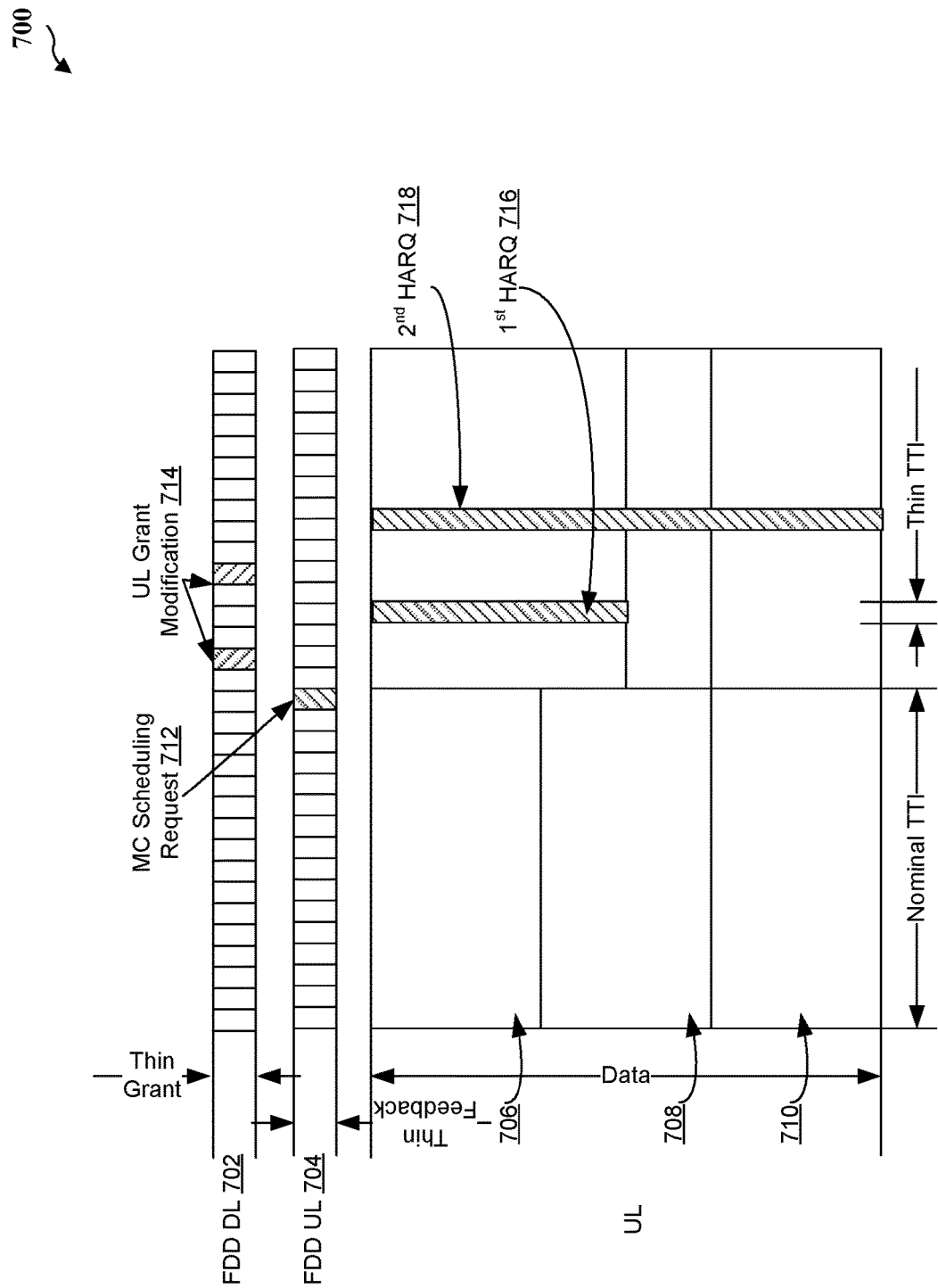

FIG. 7 is a diagram illustrating a non-limiting example of a configuration 700 for scheduling HARQ in lower latency communications. For example, configuration 700 relates to an example air interface configuration for an eNB (e.g., access point 105, eNB 204, eNB 510, eNB 904, etc.) to schedule a UE (e.g., UE 115, UE 206, UE 550, UE 902, etc.) to transmit HARQ communications having relatively lower latency than existing HARQ communications. The lower latency HARQ communications may be due to, for example, the underlying lower latency wireless communication configuration using a TTI that is less than a subframe in duration. In addition, configuration 700 allows for more reliable HARQ communications by increasing the number of links or component carriers (CCs) utilized in communicating from the UE to the eNB after an initial HARQ communication.

Configuration 700 depicts a plurality of CCs 702, 704, 706, 708, 710. CCs 702 (also referred to as a "thin grant" control channel) and 704 (also referred to as a "thin feedback" control channel), which can be FDD CCs, may include CCs configured to carry downlink and uplink control data, respectively. CCs 706, 708, and 710 can be configured to carry uplink data communications. Nominal and thin TTIs, as depicted, can be multiplexed through the two control channel CCs 702 and 704.

Configuration 700 can include a MC scheduling request 712 sent by a UE to request scheduling of resources, which is transmitted over a FDD UL CC 704. In response, a UL grant modification 714 can be sent by an eNB over the FDD DL CC 702, which can result in modification of CCs 706 and 708, as shown, to allocate more bandwidth to CC 706. A first HARQ transmission 716 is transmitted by a user equipment over CC 706 based on the UL grant modification 714.

A second UL grant modification 714 can be transmitted by the eNB. For example, as described further herein, this may be based at least in part on a parameter related to receiving the first HARQ transmission 716, such as an indication of whether the first HARQ transmission 716 is successfully received and/or decoded. Alternatively, additional bandwidth (e.g., one or more CCs or additional bandwidth over the CCs) may be granted to the UE in the second UL grant modification 714 to improve reliability of a second HARQ transmission. For example, the second UL grant modification 714 can allocate additional links (or CCs), and a second HARQ transmission 718 can be transmitted over CCs 706, 708, 710 based on the second UL grant modification 714. Thus, CCs or bandwidth related thereto can be adjusted to allow uplink HARQ transmission over one or more links (or CCs) or a certain bandwidth to balance transmit power limitations of the MC user with selection diversity.

Figure 8:
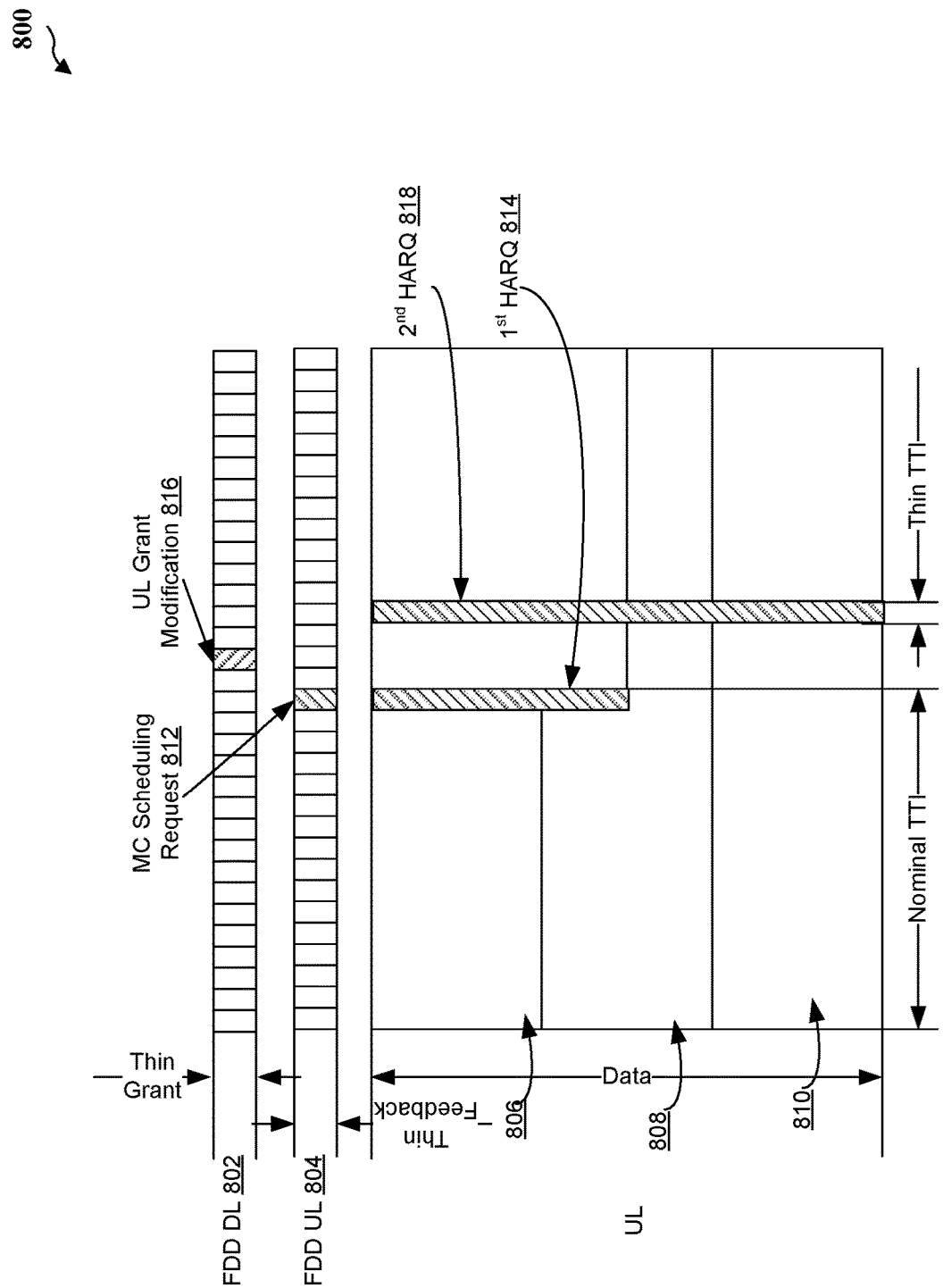

FIG. 8 is a diagram illustrating a non-limiting example of a configuration 800 for scheduling HARQ in lower latency communications. For example, configuration 800 relates to an example air interface configuration for an eNB (e.g., access point 105, eNB 204, eNB 510, eNB 904, etc.) to schedule a UE (e.g., UE 115, UE 206, UE 550, UE 902, etc.) to transmit HARQ communications having relatively lower latency than existing HARQ communications. The lower latency HARQ communications may be due to, for example, the underlying lower latency wireless communication configuration using a TTI that is less than a subframe in duration. In addition, configuration 700 allows for more efficient communications by the UE opportunistically transmitting a HARQ communication to the eNB along with a corresponding scheduling request (e.g., without first receiving a scheduling grant from the eNB).

Configuration 800 depicts a plurality of CCs 802, 804, 806, 808, 810. CCs 802 (also referred to as a "thin grant" control channel) and 804 (also referred to as a "thin feedback" control channel), which can be FDD CCs, may include CCs configured to carry downlink and uplink control data, respectively. CCs 806, 808, and 810 can be configured to carry uplink data communications. Nominal and thin TTIs, as depicted, can be multiplexed through the two control channel CCs 802 and 804.

Configuration 800 can include a MC scheduling request 812 sent by a UE to request scheduling of resources, which is transmitted over a FDD UL CC 804. The first HARQ transmission 814, in this example, is opportunistically transmitted by the user equipment with the MC scheduling request 812 to reduce uplink latency as compared to configuration 700 in FIG. 7. In this example, one or more of a first transmission bandwidth, a modulation order, and/or a code rate, etc. is selected by the MC user for the first HARQ transmission. In this example, the transmission bandwidth selected for the first HARQ transmission 814 may utilize one or more carriers (e.g., CC 806 and a portion of CC 808, as depicted). In response, a UL grant modification 816 can be sent by an eNB over the FDD DL CC 802, which can result in modification of CCs 806 and 808, as shown, to allocate more bandwidth to CC 806, and also can allocate additional links (or CCs) for a next HARQ transmission, as described. A second HARQ transmission 818 can be transmitted over CCs 806, 808, 810 based on the second UL grant modification 816.

Referring to FIGS. 9-13, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 10-13 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 9:
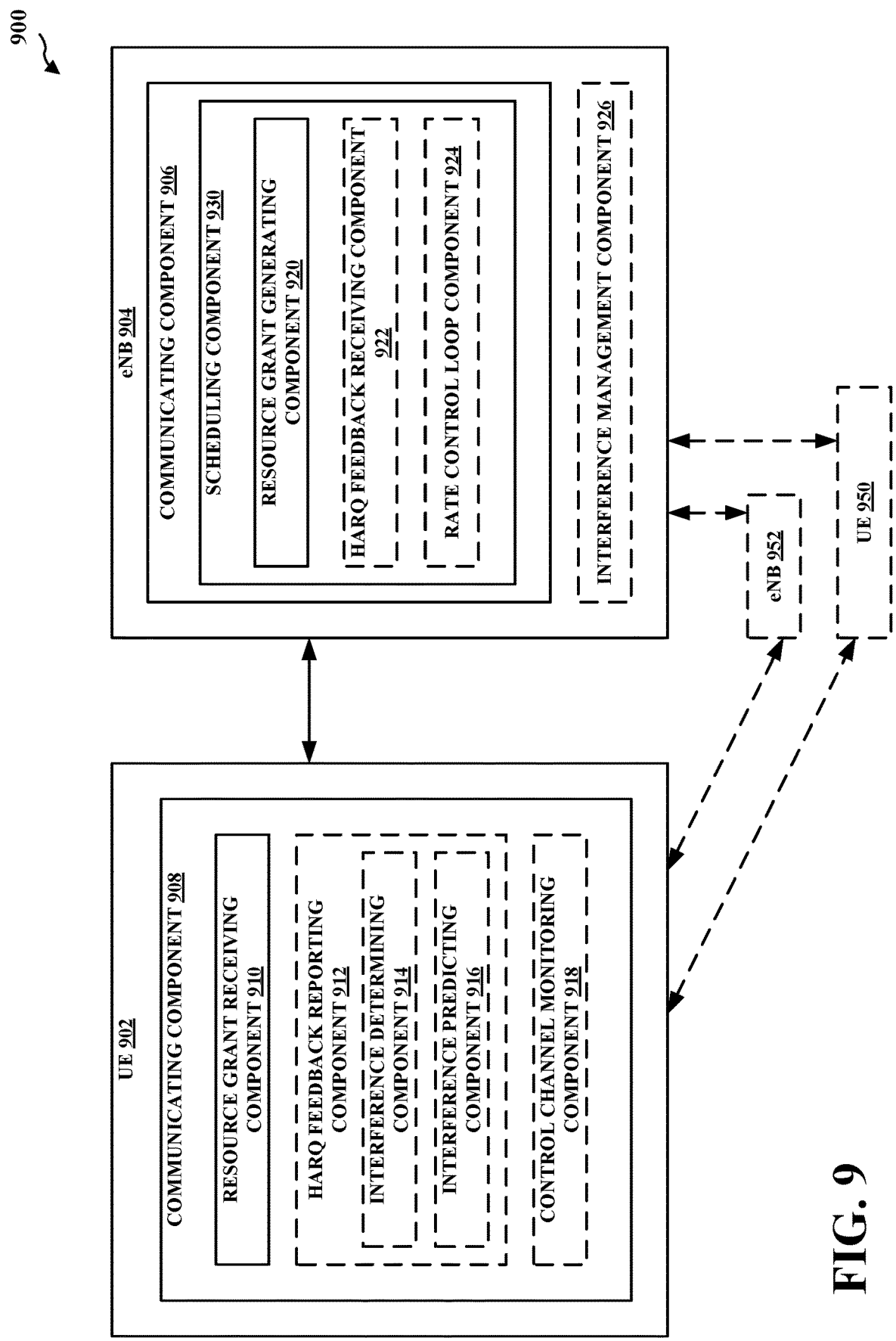
FIG. 9 is a diagram illustrating an example system in accordance with aspects described herein.

FIG. 9 illustrates an example system 900 for communicating ULL or HRLL/HRML HARQ transmissions in a wireless network according to the configurations described herein. System 900 includes a UE 902 that communicates with an eNB 904 to receive resources for receiving and transmitting ULL, or HRLL/HRML, HARQ communications in the wireless network. The UE 902 may utilize one or more of configuration 600 (FIG. 6), configuration 700 (FIG. 7), and configuration 800 (FIG. 8). Boxes shown in dashed lines in FIG. 9 may be considered optional components.

UE 902 includes a communicating component 908, as described herein, which can facilitate receiving resource grants (also referred to herein as "scheduling grants") from eNB 904 and communicating over the granted resources according to one or more configurations described herein. Additionally, eNB 904 includes a communicating component 906 for communicating the resource grants and/or other control data or packet data to UE 902 or other UEs according to one or more configurations described herein. The communicating component 906 may include or may be in communication with a scheduling component 930 for generating the resource grants for UE 902 and/or other UEs.

Communicating components 906 and/or 908 may include or may be implemented by one or more components of a device (e.g., a UE 902, eNB 904, etc.) to facilitate wired or wireless communication of data between devices. For example, communicating components 906 and/or 908 may include or may be implemented as hardware, a computer-readable medium executed by a processor, etc. In one specific example, communicating components 906 and/or 908 may include or may be implemented by at least one of a TX processor 516, 568 to transmit signals using transmitter 518, 554 over antennas 520, 552, a RX processor 570, 556 to receive signals using receiver 518, 554 over antennas 520, 552, a controller/processor 575, 559, to execute one or more functions described herein, etc., as described in FIG. 5.

Communicating component 908 may include, or be in communication with, one or more components for performing the functions disclosed herein. The communicating component 908 may include a resource grant receiving component 910 for obtaining resource grants from eNB 904, an optional HARQ feedback reporting component 912 for reporting HARQ feedback for communications received over the resource grants, and/or an optional control channel monitoring component 918 for monitoring control channels transmitted by other UEs for determining resources to opportunistically transmit HARQ communications. HARQ feedback reporting component 912 may include, or be in communication with, an interference determining component 914 and/or an interference predicting component 916. The interference determining component 914 may be configured to determine one or more interference parameters related to interference experienced when receiving a HARQ communication. The interference predicting component 916 may be configured to determine or predict one or more interference parameters related to interference associated with receiving a subsequent instance of the HARQ communication (e.g., in a future TTI). Communicating component 908, resource grant receiving component 910, HARQ feedback reporting component 912, interference determining component 914, interference predicting component 916, and/or control channel monitoring component 918 are described in more detail below for implementing at least a portion of one or more of methods 1000, 1100, 1200, and/or 1300, in FIGS. 10, 11, 12, and/or 13.

Communicating component 906 may include, or be in communication with, one or more components for performing the functions disclosed herein, which may include a resource grant generating component 920 for generating one or more resource grants for receiving and/or transmitting HARQ communications from/to a UE 902, an optional HARQ feedback receiving component 922 for obtaining HARQ feedback for HARQ communications, an optional rate control loop component 924, and/or an optional interference management component 926.

The optional rate control loop component 924 may facilitate maintaining one or more rate control loops for multiple links with UE 902 and/or for multiple interference patterns detected on each of the multiple links. The optional rate control loop component 924 may facilitate this by processing CQI or other feedback received for the links and/or interference patterns. The maintenance of a rate control loop can generally relate to a process for controlling a rate (e.g., a BLER) achievable by a link (e.g., for one or more interference patterns) corresponding to the rate control loop. For instance, the optional rate control component 924 may maintain the rate control loop by selecting a certain modulation and coding scheme (MCS) for the link (e.g., for the one or more interference patterns). The rate control loop can be updated based on feedback received for the link (e.g., and for a detected interference pattern). For example, the optional rate control loop component 924 can select a lower MCS for a strong interference pattern over a link, and a higher MCS for a weak interference pattern.

Thus, as described further herein, communicating component 906 may determine rates achievable over one or more links with a UE 902 (e.g., based on a predicted interference pattern) to achieve a certain rate (e.g., BLER) in communicating with the UE 902. Communicating component 906, resource grant generating component 920, HARQ feedback receiving component 922, rate control loop component 924, and/or scheduling component 930 are described in more detail below for implementing at least a portion of one or more of methods 1000, 1100, 1200, and/or 1300, in FIGS. 10, 11, 12, and/or 13. The optional interference management component 926 facilitate managing communications from one or more other eNBs and/or UEs to decrease potential interference during the receiving and/or transmitting the HARQ communications by the UE 902.

FIG. 9 may also include one or more UEs 950 and/or eNBs 952 that may communicate with eNB 904 and/or other eNBs/UEs to provide/receive wireless network access. In an example, eNB 904 may communicate with UE 950 similarly as with UE 902. eNB 904 may also communicate with eNB 952 over a backhaul link, as described previously. In addition, eNB 952 may communicate with UE 902 as with eNB 904 and/or over a different set of resources, using a different RAT, and/or the like. UE 950 may also communicate with UE 902 via one or more eNBs (e.g., eNB 952 and/or eNB 904), over a direct peer-to-peer link, and/or the like.

Figure 10:
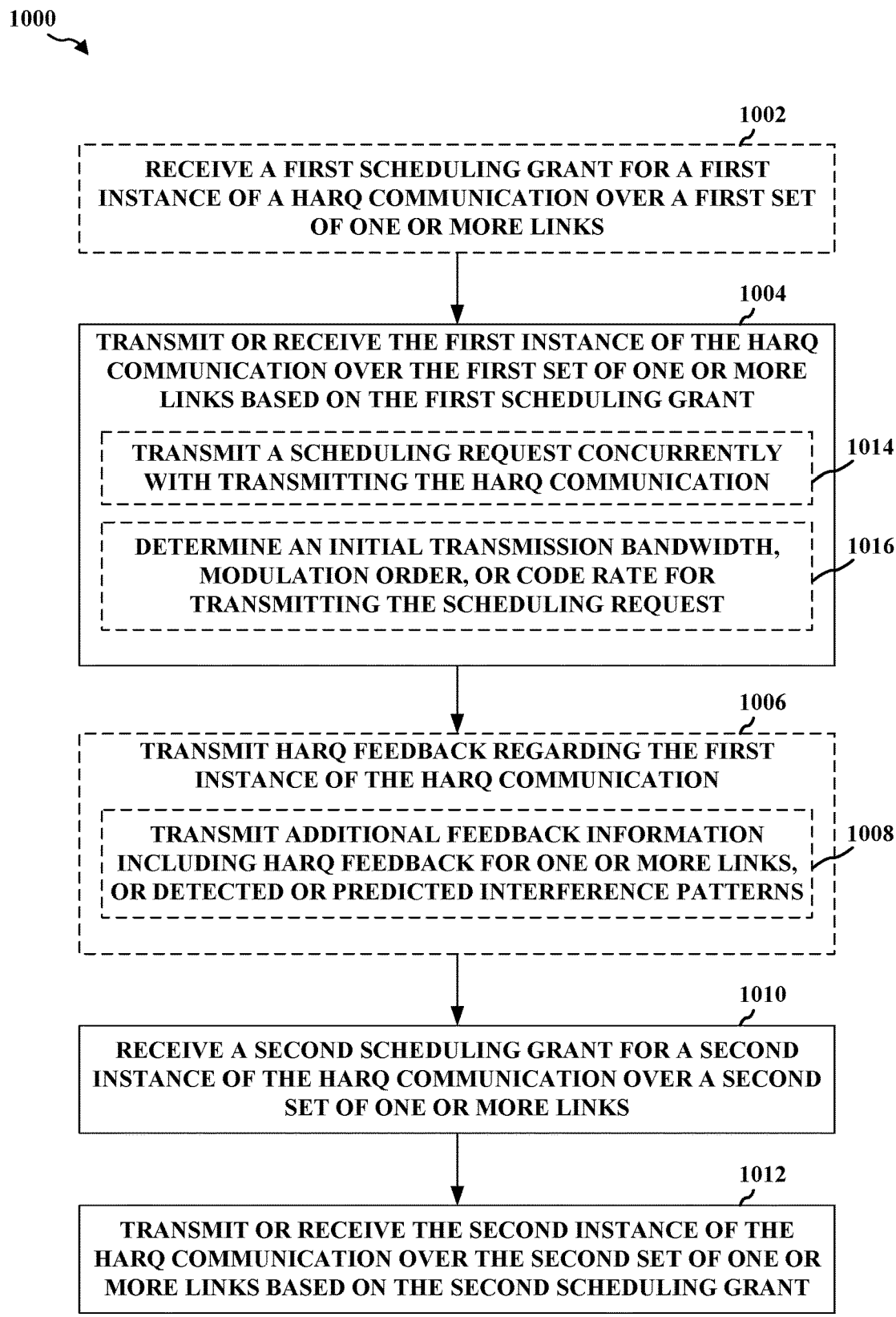
FIGS. 10-13 are flow charts of example methods of wireless communication in accordance with aspects described herein.
Figure 11:
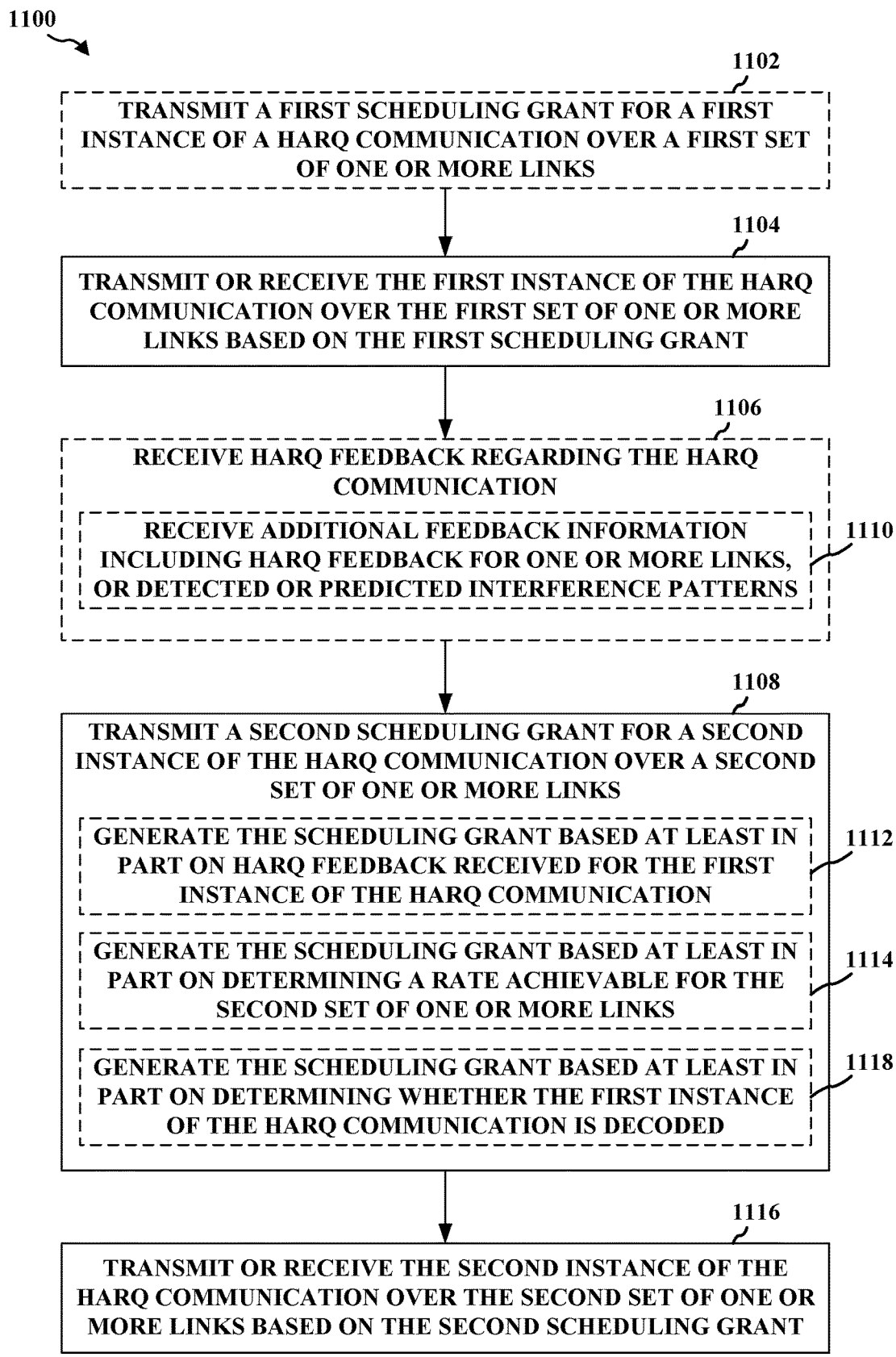

FIGS. 10 and 11 illustrate example methods 1000 and 1100 for communicating using HARQ in a wireless network. Method 1000 may be performed by a user equipment, such as UE 902 of FIG. 9, while method 1100 may be performed by a network device, such as eNB 904 of FIG. 9, in one example. Moreover, methods 1000 and 1100 relate to the exchange of communications between UE 902 and eNB 904. As discussed below, the optional "transmit or receive" actions in methods 1000 and 1100 relate to whether eNB 904 transmits a downlink grant or an uplink grant, in which case UE 902 would respectively receive based on the downlink grant or transmit based on the uplink grant. Optionally, in another example explained below, the present methods may operate when no downlink or uplink grant is initially transmitted or received.

Downlink Grant Examples

Starting from the perspective of eNB 904, method 1100 optionally includes at Block 1102, transmitting a first scheduling grant for a first instance of a HARQ communication over a first set of one or more links. In an aspect, for instance, communicating component 906 of eNB 904 (FIG. 9) can transmit the first scheduling grant for the first instance of the HARQ communication over the first set of one or more links. As described, for example, the one or more links may respectively relate to one or more CCs established between the UE 902 and eNB 904. Resource grant generating component 920, in this regard, can generate the scheduling grant (e.g., for the UE 902) to receive or transmit the HARQ communication (e.g., a downlink grant or an uplink grant, respectively), which are separately described below.

For example, the scheduling grant may indicate a certain TTI for transmitting the HARQ communication, which may include a symbol-level TTI, multiple-symbol level TTI, slot-level TTI, etc., as described, for lower latency communications. For example, resource grant generating component 920 can generate a scheduling grant for the UE 902 to receive HARQ communications over the first set of one or more downlink links, and communicating component 906 can communicate the scheduling grant to UE 902.

Correspondingly, and referring now to the perspective of UE 902, method 1000 optionally includes, at Block 1002, receiving the first scheduling grant for the first instance of a HARQ communication over the first set of one or more links. In an aspect, for instance, resource grant receiving component 910 (FIG. 9) can optionally receive the first scheduling grant for the first instance of the HARQ communication over the first set of one or more links. For example, the first scheduling grant may correspond to resources for receiving HARQ communications over the set of one or more links as specified by eNB 904. In one example, the scheduling grant can correspond to the first MC user downlink grant 612 (FIG. 6), which may allocate resources for first HARQ transmission 614.

Accordingly, in this downlink grant example, method 1100 includes, at Block 1104, transmitting the first instance of the HARQ communication over the first set of one or more links based on the first scheduling grant. Communicating component 906 can transmit the HARQ communication over the first set of the one or more links based on the first scheduling grant. As described, this can include transmitting the first HARQ transmission 614 in FIG. 6 over CC 606.

Correspondingly, in this downlink grant example, method 1000 includes, at Block 1004, receiving the first instance of the HARQ communication over the first set of one or more links based on the first scheduling grant. In an aspect, for instance, communicating component 908 of UE 902 can receive the first instance of the HARQ communication over the first set of one or more links based on the first scheduling grant. In this example, this can include communicating component 908 receiving the HARQ communication from the eNB 904 over the set of the one or more links, which may correspond to the first HARQ transmission 614 (FIG. 6), as described. In addition, in an example, the first HARQ transmission 614 can be transmitted concurrently with the first MC user downlink grant 612. Thus, in an aspect, Blocks 1102 and 1104 (FIG. 11) may occur concurrently and consequently Blocks 1002 and 1004 (FIG. 10) may also occur concurrently.

In this example, method 1000 also optionally includes, at Block 1006, transmitting HARQ feedback regarding the first instance of the HARQ communication. In an aspect, for example, HARQ feedback reporting component 912 can transmit the HARQ feedback regarding the first instance of the HARQ communication received from eNB 904. In one example, the HARQ feedback reported by HARQ feedback reporting component 912 may include an ACK/NACK indicator specifying whether the HARQ communication is successfully received and/or decoded (e.g., whether CRC passed), and may also include other additional information to allow eNB 904 to modify resources for a second HARQ communication. HARQ feedback reporting component 912 may generate the HARQ feedback as described below and/or with reference to FIG. 12.

Corresponding to the optional transmitting (e.g., by the UE) at Block 1006, method 1100 in FIG. 11 optionally includes, at Block 1106, receiving HARQ feedback regarding the HARQ communication. In an aspect, for example, HARQ feedback receiving component 922 of eNB 904 can receive the HARQ feedback regarding the HARQ communication. In one example, the HARQ feedback can correspond to the first MC user super-ACK/NACK 616 (FIG. 6).

In any case, method 1100 further includes, at Block 1108, transmitting a second scheduling grant for a second instance of the HARQ communication over a second set of one or more links. In some cases, the second set of one or more links may be different from the first set of one or more links. In an aspect, for example, communicating component 906 can transmit the second scheduling grant for the second instance of the HARQ communication over the second set of the one or more links. As described, the second set of one or more links can optionally include a different allocation of bandwidth over the one or more links (e.g., additional bandwidth allocated over at least a portion of the one or more links, etc.), which may be determined based at least in part on the HARQ feedback received from UE 902.

Moreover, for example, the scheduling grant over the second set of one or more links may vary in one or more ways as compared to the first set of the one or more links such as, for instance, in duration on one or more of the links, in modulation order specified for using over one or more of the links (e.g., a lower modulation order), in channel code rate (e.g., a lower channel code rate) on one or more of the links, etc. This may help to increase likelihood of successful communication of the second instance of the HARQ communication. The second set of the one or more links can accordingly include a set of links, related bandwidth, duration, modulation order, coding rate, and/or the like, determined to possibly increase likelihood of receiving the HARQ communications. Thus, the second set of the one or more links may correspond to a set of links determined to possibly achieve a higher target BLER, as described further herein. In an example, the second scheduling grant can correspond to the second MC user downlink grant 612 (FIG. 6) sent subsequently to the first MC user downlink grant 612.

In an example, transmitting HARQ feedback at Block 1006 may include, at Block 1008, transmitting additional feedback information including HARQ feedback for one or more links, or detected or predicted interference patterns. HARQ feedback reporting component 912 may transmit the additional feedback information including the HARQ feedback for one or more links, or detected or predicted interference patterns to the eNB 904. For example, the HARQ feedback for the one or more links may include auxiliary ACK/NACK indicators, which can be specified per link between the UE 902 and eNB 904, and can be used by the eNB 904 for update of rate control loops for each of the multiple links (and/or for each interference pattern detected on the one or more links). Moreover, in an example, the additional feedback information for the detected or predicted interference pattern may include an indication of the interference pattern(s), such as an index of the interference pattern(s). For example, the indices and related interference patterns may be known between the UE 902 and eNB 904 (e.g., based on the UE 902 specifying detected interference patterns to the eNB 904, based on a configuration received at the UE 902 from the eNB 904, etc.) such that the indices are used to identify the interference patterns between the UE 902 and eNB 904.

Thus, for example, receiving the HARQ feedback at Block 1106 may optionally include, at Block 1110, receiving additional feedback information including HARQ feedback for one or more links, or detected or predicted interference patters. HARQ feedback receiving component 922 may receive the additional feedback information including the HARQ feedback for one or more links, or detected or predicted interference patterns. For example, rate control loop component 924 of eNB 904 (FIG. 9) can be operable for maintaining rate control loops for each of the multiple links and/or for each of one or more interference patterns over each of the multiple links between eNB 904 and UE 902. In an example, the different loops can be determined and/or updated based on the additional feedback information specified in the HARQ feedback from the UE 902.

In an example, interference determining component 914 of UE 902 (FIG. 9) may determine one or more interference patterns detected over one or more links, and interference predicting component 916 of UE 902 (FIG. 9) may predict one or more interference patterns over the one or more links in a subsequent TTI. Accordingly, for example, rate control loop component 924 may determine one or more rate control loops corresponding to the detected interference patterns (e.g., based on a received index). Rate control loop component 924 can further associate reported auxiliary ACK/NACK indicators with the rate control loop for the corresponding link and related detected interference pattern to update rate control information based on the auxiliary ACK/NACK indicators. In another example, as described further herein, resource grant generating component 920 of eNB 904 (FIG. 9) may use the predicted interference patterns in scheduling resources for a subsequent instance of the HARQ communication based on determining rates achievable for the predicted interference pattern over the one or more links.

In additional examples, the other additional information in the HARQ feedback may include an implicit or explicit indication of links or grants requested for use in scheduling a subsequent HARQ transmission by the eNB 904. For example, in a UE-centric configuration, HARQ feedback reporting component 912 can determine one or more links for which to request configuration for receiving a subsequent instance of the HARQ communication based at least in part on interference detected by interference determining component 914 and/or interference predicted by interference predicting component 916. Similarly, as described further herein with respect to eNB 904, resource grant generating component 920 may determine the configuration based on detected and/or predicted interference.

For example, HARQ feedback reporting component 912 may manage one or more outer rate control loops or other mechanism to: 1) track rates attainable over one or more links for one or more detected interference patterns; 2) update the loops based on detected interference patterns; and 3) determine a configuration of the one or more links to achieve a desired rate based on predicted interference in a subsequent period of time corresponding to the subsequent instance of the HARQ communication. HARQ feedback reporting component 912 can accordingly indicate to eNB 904 a configuration of one or more links requested for the subsequent instance of the HARQ communication. In other examples, the other information in the HARQ feedback may include control messages for suppressing interference detected from (and/or predicted for) neighboring cells, or otherwise coordinating transmission among cells, etc.

In any case, for example, transmitting the second scheduling grant at Block 1108 may include, at Block 1112, generating the scheduling grant based at least in part on HARQ feedback received for the first instance of the HARQ communication. Resource grant generating component 920 can generate the scheduling grant based at least in part on the HARQ feedback received for the first instance of the HARQ communication. As described herein, generating a second scheduling grant for a second instance of the HARQ communication may increase likelihood of receiving the HARQ communication. For example, resource grant generating component 920 may utilize the HARQ feedback, in this example, to grant resources over additional links for receiving the second instance of the HARQ communication, grant additional bandwidth over one or more of the links, etc.

For example, resource grant generating component 920 can determine a different set of links, which may or may not include each of the link(s) in the first set of one or more links, between the UE 902 and eNB 904 that may increase likelihood of receiving the second instance of the HARQ communication. In an example, transmitting the second scheduling grant at Block 1108 may further include, at Block 1114, generating the scheduling grant based at least in part on determining a rate achievable for the second set of one or more links. Resource grant generating component 920 may generate the scheduling grant (e.g., determine the different set of links) based at least in part on determining a rate achievable for the second set of one or more links.

For example, the rate (e.g., BLER) achievable for each loop may correspond to a modulation and coding scheme (MCS) selected based on feedback for the link, and/or a signal-to-noise ratio (SNR) over the link (e.g., for the associated interference pattern), which can be managed by rate control loop component 924. For example, the MCS can be used to determine the modulation scheme (e.g., QPSK, 64 quadrature amplitude modulation (64QAM), etc.) and the coding scheme (e.g., type of code, such as turbo-code, etc., code rate, codeword length etc.).

Thus, for example, through simulations, the BLER for the coding scheme at different SNRs can be computed resulting in a link curve for the MCS, which represents the BLER versus the SNR. Rate control loop component 924 can compute the curve over a history of BLERs achieved at different SNRs for the MCS and/or can receive the curve (e.g., as a list of representative data points) from one or more sources such as, for instance, a configuration from one or more eNBs (e.g., eNB 904) or other network components, a configuration stored at the UE 902, etc. In this example, rate control loop component 924 can estimate the SNR over the link (e.g., based on CQI feedback, ACK/NACK bits, rate controller outer loop, etc.), and can accordingly determine the corresponding BLER from the link curve for the MCS.

In addition, as described further herein, the rate for each loop may be updated based on additional feedback information from the UE 902 in prior TTIs that indicates detected interference patterns and ACK/NACK indicators over the links between UE 902 and eNB 904. Thus, based on the rate and predicted interference pattern for a subsequent TTI, resource grant generating component 920 may determine the second set of the one or more link as predicted to achieve a threshold rate (e.g., BLER) in the subsequent TTI.

In addition, in some examples, resource grant generating component 920 may determine the different set of links based at least in part on one or more links for which ACK is reported for the first instance of the HARQ communication and/or one or more links having a detected and/or predicted interference level below a threshold, etc., which can be indicated in the HARQ feedback from the UE 902. In another example, in generating the scheduling grant based on the HARQ feedback for the first instance of the HARQ communication, resource grant generating component 920 can additionally or alternatively determine a different allocation of bandwidth over the different set of links for transmitting the HARQ communication (e.g., based on the HARQ feedback from UE 902 to ensure likelihood of receiving the HARQ communication by the UE 902).

Correspondingly, from the UE perspective, method 1000 in FIG. 10 further includes, at Block 1010, receiving the second scheduling grant for a second instance of the HARQ communication over the second set of one or more links. In an aspect, for example, resource grant receiving component 910 can receive the second scheduling grant for the second instance of the HARQ communication over the second set of the one or more links. As described, the second set of one or more links optionally can be different from the first set of one or more links, and may or may not include a different allocation of bandwidth over the different set of the one or more links. In this downlink grant example, the second set of one or more links may be determined from HARQ feedback transmitted at Block 1006 and/or 1008. In one example, the second scheduling grant can correspond to second MC user downlink grant 612 (FIG. 6).

Further in this downlink grant example, method 1100 in FIG. 11 includes, at Block 1116, transmitting or receiving the second instance of the HARQ communication over the second set of the one or more links based on the second scheduling grant. In an aspect, for example, communicating component 906 can transmit or receive the second instance of the HARQ communication to UE 902 over the second set of the one or more links based on the second scheduling grant. For example, the HARQ communication may correspond to the second HARQ transmission 618 (FIG. 6) transmitted over CCs 606, 608, and 610.

Correspondingly, from the UE perspective, method 1000 in FIG. 10 further includes, at Block 1012, receiving the HARQ communication (e.g., the second instance of the HARQ communication) over the second set of one or more links based on the second scheduling grant. In an aspect, for example, communicating component 908 of UE 902 can receive the HARQ communication from eNB 904 over the second set of one or more links based on the second scheduling grant. As described, the second set of the one or more links may include additional links and/or additional bandwidth in one or more links, etc. to increase likelihood of receiving the second HARQ transmission. In one example, the HARQ communication can correspond to the second HARQ transmission 618 (FIG. 6). In addition, in an example, the second HARQ transmission 618 can be transmitted concurrently with the second MC user downlink grant 612. Thus, in an aspect, Blocks 1108 and 1116 (FIG. 11) may occur concurrently and consequently Blocks 1010 and 1012 (FIG. 10) may also occur concurrently.

Uplink Grant Examples

In these examples, the first scheduling grant transmitted at Block 1102 (e.g., by communicating component 906) in FIG. 11 and received at Block 1002 (e.g., by resource grant receiving component 910) in FIG. 10 can relate to uplink resources for transmitting the HARQ communication by the UE 902. For example, the first scheduling grant can correspond to the first uplink grant modification 714 (FIG. 7) and may be transmitted by eNB 904 in response to receiving a scheduling request transmitted by communicating component 908 of UE 902 to eNB 904 (e.g., MC scheduling request 712).

Accordingly, in this example, Block 1004 (e.g., executed by communicating component 908) can include transmitting (e.g., to eNB 904) the first instance of the HARQ communication over the first set of one or more links based on the first scheduling grant. Similarly, in this example, Block 1104 (e.g., executed by communicating component 906 of eNB 904) can include receiving the first instance of the HARQ communication (e.g., from UE 902) over the first set of one or more links based on the first scheduling grant. For example, the HARQ communication can correspond to first HARQ transmission 716 (FIG. 7), which can be transmitted over resources specified in the UL grant modification 714, as described.

In another example, as described, scheduling grants may not be communicated at Block 1002 and 1102, in which case Block 1004 can include transmitting the first instance of the HARQ communication opportunistically (e.g., by communicating component 908 to eNB 904). Thus, in one example, transmitting the first instance of the HARQ communication at Block 1004 may include, at Block 1014, transmitting a scheduling request concurrently with transmitting the HARQ communication. Communicating component 908 can transmit the scheduling request concurrently with transmitting the HARQ communication (e.g., MC scheduling request 812 and first HARQ transmission 814 in FIG. 8).

In addition, in this example, transmitting the first instance of the HARQ communication at Block 1004 may include, at Block 1016, determining an initial transmission bandwidth, modulation order, or code rate for transmitting the scheduling request. In this example, control channel monitoring component 918 can determine the initial transmission bandwidth, modulation order, code rate, etc. for transmitting the scheduling request. For example, in order for the scheduling request and/or HARQ communication to be transmitted to eNB 904 over one or more links, control channel monitoring component 918 may monitor control channels transmitted by other UEs (e.g., to eNB 904) to select an initial transmission bandwidth, modulation order, code rate, etc. that does not substantially interfere with the other UEs. For example, control channel monitoring component 918 can monitor the control channels to determine bandwidths, modulation orders, code rates, etc. used by other UEs, and may select bandwidths, modulation orders, code rates, etc. that do not interfere (e.g., that are not used by) the other UEs.

In this example, Block 1104 (e.g., executed by communicating component 906 of eNB 904) can thus include receiving the first instance of the HARQ communication (e.g., from UE 902). Communicating component 906, however, may not successfully receive the first instance of the HARQ communication or may otherwise desire transmissions of HARQ communication to use different links. Accordingly, transmitting the scheduling grant for a second instance of the HARQ communication at Block 1108 may optionally include, at Block 1118, generating the scheduling grant based at least in part on determining whether the first instance of the HARQ communication is decoded.

Resource grant generating component 920 can accordingly generate the scheduling grant based at least in part on determining whether the first instance of the HARQ communication is decoded (e.g., by the communicating component 906). For example, this can include resource grant generating component 920 generating the grant to use a different set of links for communicating the HARQ communication to increase likelihood of receiving the HARQ communication.

As described, this can include resource grant generating component 920 selecting different links and/or increasing bandwidth over certain links based on ACK/NACK feedback transmitted for the links, rates achieved based on the rate control loop maintained by rate control loop component 924, and/or the like. For example, due to an overall transmit power limitation at UE 902, it may be advantageous for resource grant generating component 920 to schedule UE 902 on its most favorable link (e.g., on a link having a highest rate according to a related rate control loop) rather than on multiple links. In addition, in an example, resource grant generating component 920 can generate the scheduling grant to employ fountain HARQ to overcome the UE's transmit power limitation. Fountain HARQ can generally refer to a transmitter (e.g., communicating component 906 of eNB 904) selecting an initial rate/modulation (e.g., MCS) based on channel conditions, payload size, etc., and sending data back-to-back until an acknowledgement feedback is received by the receiver (e.g., from UE 902), indicating that the CRC has passed.

In any case, in this example, transmitting the second scheduling grant, at Block 1108 (e.g., by communicating component 906), may include transmitting the grant for the second instance of the HARQ communication over the second set of one or more links (e.g., that may be different than the first set of the one or more links) to the UE 902. Accordingly, receiving the second scheduling grant, at Block 1010 (e.g., by resource grant receiving component 910), may include receiving the grant for transmitting the second instance of the HARQ communication over the second set of the one or more links (e.g., from eNB 904). For example, the second scheduling grant can correspond to the second UL grant modification 714 (FIG. 7), uplink grant modification 816 (FIG. 8), etc.

Additionally, in this example, Block 1012 (e.g., executed by communicating component 908 of UE 902) can include transmitting the HARQ communication (e.g., to the eNB 904). Similarly, Block 1116 (e.g., executed by communicating component 906 of eNB 904) can include transmitting or receiving the HARQ communication over the second set of one or more links (e.g., from the UE 902) based on the second scheduling grant. For example, the HARQ communication can correspond to the second HARQ transmission 718 (FIG. 7), second HARQ transmission 818 (FIG. 8), etc. In one aspect, the second HARQ transmission may have additional links associated therewith to increase likelihood of eNB 904 receiving the HARQ communication.

Figure 12:
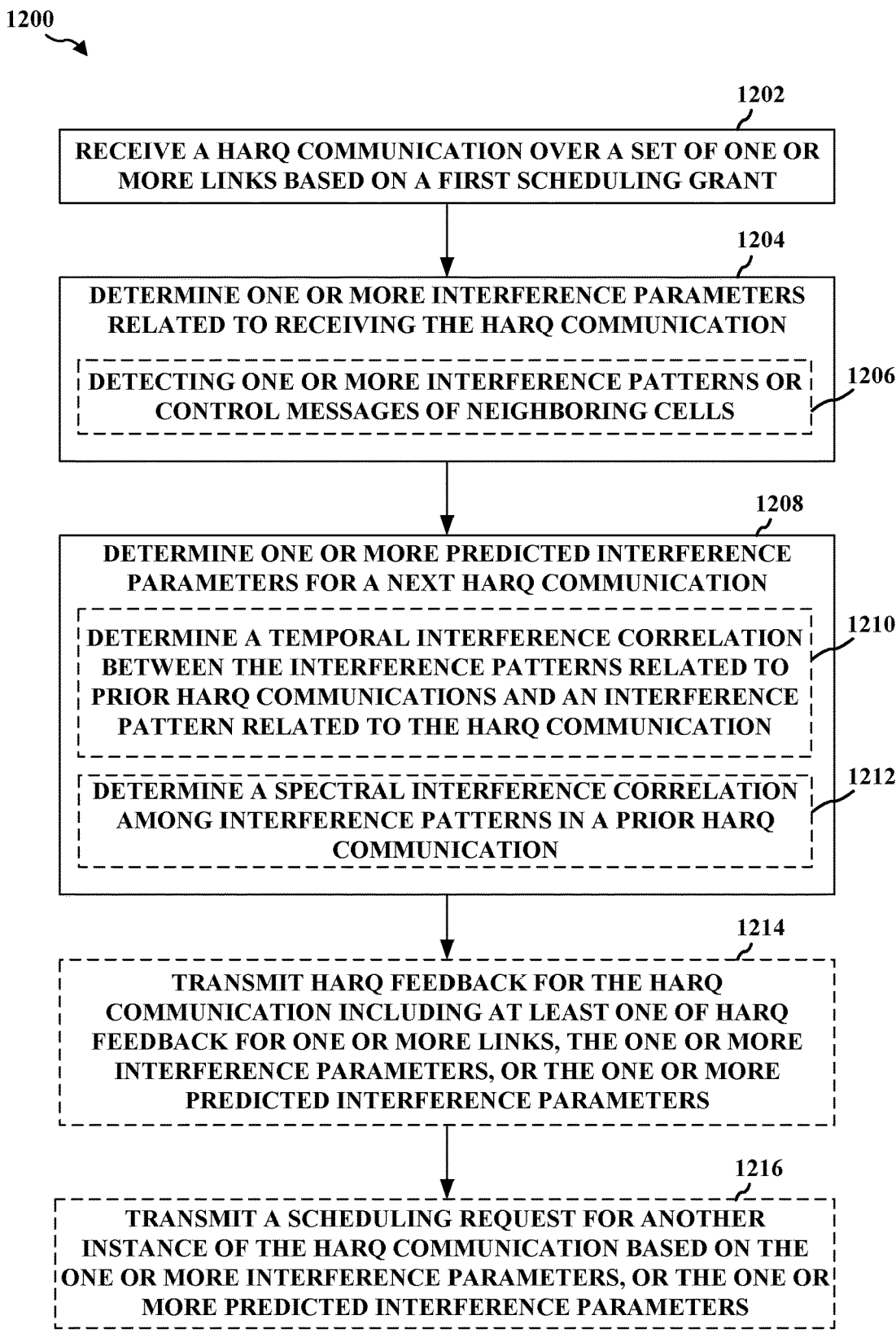
Figure 13:
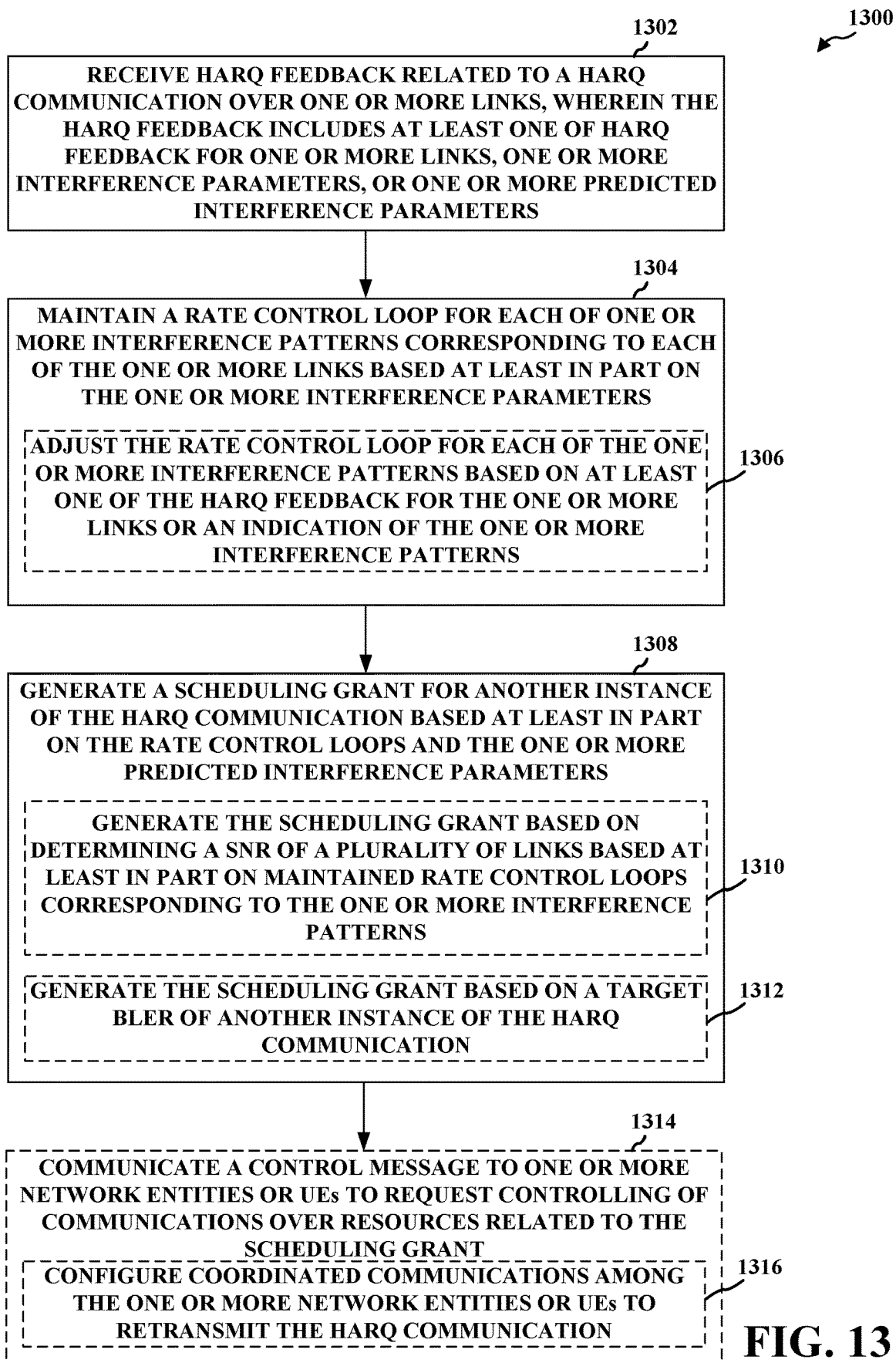

FIGS. 12 and 13 illustrate example methods 1200 and 1300 for a receiver and scheduler to facilitate reporting and utilizing feedback to determine one or more links for a scheduling grant. FIG. 12 illustrates an example method 1200 for communicating HARQ feedback including interference parameters in accordance with aspects described herein.

Method 1200 includes, at Block 1202, receiving a HARQ communication over a set of one or more links based on a first scheduling grant. In an aspect, for example, communicating component 908 of UE 902 (FIG. 9) can receive the HARQ communication over the set of one or more links based on the first scheduling grant, as described. In one example, resource grant receiving component 910 can receive the first scheduling grant from eNB 904, and then can receive the HARQ communication over resources specified in the scheduling grant. For example, the scheduling grant may correspond to the first MC user downlink grant 612, and the HARQ communication can correspond to first HARQ transmission 614 in FIG. 6.

Method 1200 includes, at Block 1204, determining one or more interference parameters related to receiving the HARQ communication. In an aspect, for example, interference determining component 914 can determine the one or more interference parameters related to receiving the HARQ communication. Determining the one or more interference parameters at Block 1204 may include, at Block 1206, detecting one or more interference patterns or control messages of neighboring cells. For example, interference determining component 914 can determine one or more interference patterns or control messages of neighboring cells (e.g., as detected when receiving the HARQ communication). For example, each interference pattern may correspond to one or more interfering nodes that are detected as transmitting in a similar time period and/or using similar resources as eNB 904 when eNB 904 transmits the HARQ communication.

For example, the interference from neighboring nodes (e.g., neighboring cells provided by eNB 904 and/or neighboring eNBs) can be multimodal in that a set of interferers may change from one TTI to the next and can be different across multiple links between UE 902 and eNB 904. In this regard, interference determining component 914 can detect distinct interference patterns of dominant interferers over each link based on measuring pilot signals or control channels from the interferers. In addition, for example, interference determining component 914 may detect periodic nulltones of the interferers for determining an interference pattern of the interferer. In any case, in this regard, interference determining component 914 can detect interference patterns of multiple interferers for each link, which when reported to the eNB 904 can be used to schedule HARQ communications. This can reduce the multimodal PDF to a set of unimodal PDFs for each interference pattern over each link.

Method 1200 also includes, at Block 1208, determining one or more predicted interference parameters for a next HARQ communication. In an aspect, for example, interference predicting component 916 can determine the one or more predicted interference parameters for the next HARQ communication. For example, interference predicting component 916 can determine one or more predicted interference patterns that may be detected in a subsequent TTI.

In one example, determining the one or more predicted interference parameters at Block 1208 may optionally include, at Block 1210, determining a temporal interference correlation between the interference patterns related to prior HARQ communications and an interference pattern related to the HARQ communications. Interference predicting component 916 can determine the temporal interference correlation between the interference patterns related to prior HARQ communications and an interference pattern related to the HARQ communications. For example, interference predicting component 916 can track previous interference patterns detected by interference determining component 914 for determining a temporal interference correlation for predicting interference in a subsequent TTI.

In one specific example, interference predicting component 916 can generate a Markov chain that has states corresponding to a particular set of interferers. In one example, a Markov chain can be defined for each interferer (e.g., each detected interference pattern) having an "interferer on" state and an "interferer off" state to identify presence of interference from the interferer or not. In this example, interference predicting component 916 can train the Markov chain over time to determine (e.g., based on prior TTIs) a probability (e.g., a percentage) of presence of interference. For instance, interference predicting component 916 can determine the probability based on predicting an interferer moving to an "interferer on" state in a TTI when the interferer was in an "interferer off" state in a previous TTI, and/or vice versa. Interference predicting component 916 can accordingly predict whether and/or when an interferer is likely to be on or off in a subsequent TTI or other measurement of time based on whether the interferer is on or off in a current TTI, and based on the Markov chain.

Additionally, in an example, determining the one or more predicted interference parameters at Block 1208 may include, at Block 1212, determining a spectral interference correlation among interference patterns in a prior HARQ communication. Interference predicting component 916 can determine the spectral interference correlation among interference patterns in the prior HARQ communication. For example, interference predicting component 916 can determine spectral interference correlation across different links with the eNB 904 to predict interference patterns for one or more subsequent TTIs.

For example, interference predicting component 916 can analyze interference patterns previously detected by interference determining component 914 to determine a correlation of interference patterns among links. Thus, for instance, interference predicting component 916 may determine that one or more interference patterns are detected over a first link when one or more other interference patterns are detected over another link (e.g., at a similar TTI or other time measurement), and may predict interference in a subsequent TTI based on this association. Similarly, for example, interference predicting component 916 may determine interference patterns over the first link separated in time by certain interference patterns over another link, and may predict interference on at least one of the links in a subsequent TTI based on the time separation. It is to be appreciated that interference predicting component 916 may utilize any suitable spectral interference correlation (e.g., along with the temporal correlations) to predict interference in a subsequent TTI (e.g., by determining spectral associations with temporal predictions about the interference).

Method 1200 optionally includes, at Block 1214, transmitting HARQ feedback for the HARQ communication including at least one of HARQ feedback for one or more links, the one or more interference parameters, and/or the one or more predicted interference parameters. In an aspect, for example, HARQ feedback reporting component 912 can transmit the HARQ feedback for the HARQ communication including at least one of HARQ feedback for one or more links, the one or more interference parameters, and/or the one or more predicted interference parameters. In an example, as described, the interference parameters and/or predicted interference parameters may correspond to an index related to an associated interference pattern. In this regard, for example, HARQ feedback reporting component 912 can transmit the HARQ feedback to eNB 904 for determining a scheduling grant for a subsequent HARQ communication. For example, the HARQ feedback can correspond to the first MC user super-ACK/NACK 616 in FIG. 6.

In addition, transmitting the HARQ feedback can include HARQ feedback reporting component 912 indicating auxiliary ACK/NACK for each link, as described above. For instance, HARQ feedback reporting component 912 can determine the auxiliary ACK/NACK for each link based at least in part on comparing a demodulator signal-to-noise ratio (SNR) of each link to one or more thresholds (e.g., ACK determined for the link where the SNR achieves one of the thresholds and NACK otherwise). In another example, HARQ feedback reporting component 912 can determine the auxiliary ACK/NACK for each link based at least in part on comparing a log likelihood ratio (LLR) of a decoder to estimate packet error rate (PER) based on current received signals, which can be quantized to two or more thresholds indicating ACK or NACK. In either case, for example, one or more thresholds can be set to achieve one or more BLERs. For example, the one or more BLERs may be lower than a BLER for the first instance of the HARQ communication. Moreover, for example, the number of instances of HARQ communications can be limited such that after a maximum number of instances are communicated, the HARQ communication may not be retransmitted. The auxiliary ACK/NACK, as described herein, can facilitate update of rate control loops for associated links and/or related interference patterns.

At least a portion of method 1200 may also be performed by components of eNB 904 (e.g., Blocks 1202, 1204, 1206, 1208, 1210, 1212, and/or 1214), which may be in addition to the components of the UE 902 performing method 1200, as described above. For example, communicating component 906 may receive the HARQ communication (e.g., from a UE 902) over a set of one or more links based on a first scheduling grant, at Block 1202, where communicating component. 908 transmits the HARQ communication (e.g., at Block 1202). In addition, scheduling component 930 may determine one or more interference parameters related to receiving the HARQ communication, as described above with respect to interference determining component 914 and Block 1204. Scheduling component 930 may also determine one or more predicted interference parameters for a next HARQ communication, as described above with respect to interference predicting component 916 and Block 1206. Thus, in an example, scheduling component 930 may include a first component similar to or the same as an interference determining component 914 and a second component similar to or the same as interference predicting component 916, etc.

In any case, in this example, method 1200, as described above with respect to components of the UE 902, can include, at Block 1216, transmitting a scheduling request for another instance of the HARQ communication based on the one or more interference parameters, or the one or more predicted interference parameters. Communicating component 908 can transmit the scheduling request for the another instance of the HARQ communication based on the one or more interference parameters, or the one or more predicted parameters. For example, communicating component 908 can generate the scheduling request to request one or more additional or alternative links based on the determined interference (e.g., determined by interference determining component 914) and/or predicted interference (e.g., predicted by interference predicting component 916). For example, communicating component 908 may generate the scheduling request in an attempt to achieve a target BLER in one or more time periods by requesting additional resources. In addition, communicating component 906 can communicate a resource grant based on the scheduling grant to the UE 902 for transmitting or receiving the another instance of the HARQ communication.

FIG. 13 illustrates an example method 1300 for generating scheduling grants for subsequent HARQ communications based on received HARQ feedback in accordance with aspects described herein. Method 1300 includes, at Block 1302, receiving HARQ feedback related to a HARQ communication over one or more links, wherein the HARQ feedback includes at least one of HARQ feedback for one or more links, one or more interference parameters, and/or one or more predicted interference parameters. In an aspect, for example, HARQ feedback receiving component 922 (FIG. 9) can receive (e.g., from UE 902) HARQ feedback related to a HARQ communication over one or more links, wherein the HARQ feedback includes at least one of HARQ feedback for one or more links, one or more interference parameters, or one or more predicted interference parameters. In an example, the one or more interference parameters or predicted interference parameters may correspond to an index of a related interference pattern, and thus, as described below, the related interference pattern may be identified based on the index. For example, the HARQ feedback can correspond to the first MC user super-ACK/NACK 616 in FIG. 6.

Method 1300 can also include, at Block 1304, maintaining a rate control loop for each of one or more interference patterns corresponding to each of the one or more links based at least in part on the one or more interference parameters. In an aspect, for example, rate control loop component 924 can maintain the rate control loop for each of one or more interference patterns corresponding to each of the one or more links based at least in part on the one or more interference parameters. For example, the one or more interference parameters may identify one or more interference patterns detected by the UE 902 for each link over which a HARQ communication from eNB 904 is received. For example, rate control loop component 924 may determine an interference pattern corresponding to an index received in the HARQ feedback, as described, and may accordingly update the rate control loop corresponding to the index of a detected interference pattern (e.g., based on related HARQ feedback for the associated link).

In any case, maintaining the rate control loops at Block 1304 may include, at Block 1306, adjusting the rate control loop for each of the one or more interference patterns based on at least one of the HARQ feedback for the one or more links and/or an indication of the one or more interference patterns. In this regard, rate control loop component 924 can adjust the rate control loop for each of the one or more interference patterns based on at least one of the HARQ feedback for the one or more links and/or an indication of the one or more interference patterns.

For example, where the one or more interference parameters in the HARQ feedback indicate an interference pattern for a link for which rate control loop component 924 has not established a rate control loop, rate control loop component 924 can establish a rate control loop for the interference pattern over the link. For other interference patterns indicated by the one or more interference parameters, rate control loop component 924 can determine an auxiliary ACK/NACK indicator for the interference pattern and/or for the associated link between UE 902 and eNB 904 (e.g., based on the additional HARQ feedback for the one or more links received from the UE 902 at Block 1110 of FIG. 11). Rate control loop component 924 may accordingly update the rate control loop based on the auxiliary ACK/NACK indicator. It is to be appreciated that the rate control loops managed by rate control loop component 924 for each link and/or related interference pattern may include rate control loops that update MCS based on outer loop adjustments. In this regard, rate control loop component 924 can update the rate control loop by making an outer loop adjustment based on the auxiliary ACK/NACK indicator for the link and/or associated interference pattern. It is to be appreciated that the rate control loops may initially set MCS based on indicated reference channel and interference to achieve a target BLER.

Method 1300 also includes, at Block 1308, generating a scheduling grant for another instance of the HARQ communication based at least in part on the rate control loops and the one or more predicted interference parameters. In an aspect, for example, resource grant generating component 920 can generate the scheduling grant for another instance of the HARQ communication based at least in part on the rate control loops and the one or more predicted interference parameters. For example, the generated scheduling grant can correspond to the second MC user downlink grant 612 in FIG. 6. The one or more predicted interference parameters may include predicted interference patterns determined for each of multiple links between UE 902 and eNB 904 in a subsequent TTI.

In an aspect, resource grant generating component 920 can generate the scheduling grant for the HARQ communication in the subsequent TTI to include a number of links based at least in part on determining links that can achieve a SNR that may allow for providing a target BLER. Thus, generating the scheduling grant at Block 1308 may optionally include, at Block 1310, generating the scheduling grant based on determining a SNR of a plurality of links based at least in part on maintained rate control loops corresponding to the one or more interference patterns.

For example, resource grant generating component 920 can determine the links that can achieve the SNR in the subsequent TTI based on the predicted interference patterns for the links. For instance, resource grant generating component 920 can determine an SNR for a link based on determining the SNR of an equivalent additive white Gaussian noise (AWGN) single-input single-output (SISO) signal for each rate control loop, as managed by rate control loop component 924. The rate control loops may correspond to the interference pattern(s) indicated for the link(s) in the HARQ feedback.

In addition, as described, the target BLER for the HARQ communication can vary based on the number of the HARQ communications (e.g., subsequent HARQ communications can have a lower target BLER such to increase likelihood of receiving the subsequent HARQ communications). Generating the scheduling grant at Block 1308 may also optionally include, at Block 1312, generating the scheduling grant based on a target BLER of another instance of the HARQ communication.

For example, resource grant generating component 920 can generate the scheduling grant (e.g., determine resources for scheduling) based on the target BLER (e.g., to achieve or attempt to achieve the target BLER) for another instance of the HARQ communication. For example, the BLER may be based at least in part on an accumulated capacity after the HARQ communication to which the HARQ feedback relates as well as the AWGN SNR that is determined to produce the target BLER for the subsequent HARQ communication in the subsequent TTI, as described above. Additionally, in an example, resource grant generating component 920 can consider other parameters in determining resources for achieving the target BLER. For example, communicating component 908 may detect other UEs on other links having similar frequency resources (e.g., UEs using the nominal TTI) that may not be behaving as expected (e.g., not backing off due to erroneous decoding of control channels over the thin TTIs). Resource grant generating component 920 may determine whether additional resources should be granted/requested to achieve the target BLER based on such considerations.

It is to be appreciated that there may be some factors that limit the accuracy of the one or more interference parameters and/or one or more predetermined interference parameters in a subsequent time period related to generation of the scheduling grant at Block 1308. For example, the interference may change from one nominal TTI to the next TTI and/or even within a given nominal TTI (e.g., across thin TTIs). For example, another HRLL/HRML UE 950 may determine to communicate with another neighboring eNB 952 in the same nominal or thin TTI over a similar set of frequency resources (e.g., based on a scheduling grant from the 952) without UE 902 and/or eNB 904 knowing of this communication. In addition, even if the interference level could be substantially predicted, it may be excessive such that high levels of reliability of communications from the UE 902 during such time periods may not be achievable. Accordingly, eNB 904 may provide a proactive management of interference to ensure reliable HARQ transmissions to/from UE 902. In one example, eNB 904 may provide the proactive management of interference where the one or more interference parameters or predicted interference parameters indicate a level of interference that achieves a threshold.

Accordingly, method 1300 may optionally include, at Block 1314, communicating a control message to one or more network entities or UEs to request controlling of communications over resources related to the scheduling grant. Interference management component 926 may communicate the control message to the one or more network entities (e.g., eNB 952) or UEs (e.g., UE 950) to request controlling of communications over the resources related to the scheduling grant. For example, interference management component 926 may communicate the control message to eNB 952 and/or UE 950 (e.g., over the air, over a wired or wireless backhaul link, etc.) to indicate the resources related to the scheduling grant and/or to request that the eNB 952 avoid scheduling over the resources and/or that the UE 950 avoid communicating over the resources. In an example, interference management component 926 may communicate the control message following receiving NACK feedback for the HARQ transmission and/or one or more related retransmissions to improve reliability of receiving a subsequent retransmission. In any case, the eNB 952 can avoid scheduling UE 950 and/or other UEs over the resources indicated in the control message, schedule a fraction of bandwidth over the resources, avoid scheduling over a certain frequency band that overlaps the indicated resources, etc., so as not to cause interference over the resources related to the scheduling grant for UE 902. In an example, eNB 952 may schedule UE 950 in a current or subsequent available time period (e.g., a next nominal or thin TTI, etc.) so as not to interfere with the resources indicated in the control message. The control message may indicate, for example, a TTI (nominal or thin TTI) over which to avoid communicating, one or more frequency resources over which to avoid communicating, one or more communication activities or processes to be avoided during the TTI, and/or the like. Thus, in one example, where the eNB 952 communicates with UE 950 over a different frequency band, it may determine that avoidance of scheduling over the TTI may not be necessary. In any case, where the eNB 952 and/or UE 950 avoid scheduling communications over the resources, this can effectively facilitate proactive interference management over the resources to improve reliability of communications from UE 902 over the resources.

It is to be appreciated that interference management component 926 may communicate the control message to UE 950 as well, and UE 950 may avoid transmitting to eNB 952 or other eNBs over the resources based on determining the resources indicated in the control message. In this example, UE 950 may request additional resources from eNB 952 for transmitting its communication, may report NACK to the eNB 952 to receive additional resources, may await receipt of additional resources from eNB 952 based on eNB 952 not receiving communications from UE 950 over the resources, etc. Moreover, in an example, interference management component 926 can similarly communicate control messages to UE 950 and/or eNB 952 for uplink resources granted to UE 902 by eNB 904 to facilitate managing interference over the uplink resources to allow UE 902 to reliably transmit communications to eNB 904.

In addition, for example, communicating the control message at Block 1314 may optionally include, at Block 1316, configuring coordinated communications among the one or more network entities or UEs to retransmit the HARQ communication. Interference management component 926 can configure the coordinated communications among the one or more network entities (e.g., eNB 952) or UEs (e.g., UE 950) to retransmit the HARQ communication. For example, the control messages communicated by interference management component 926 can include information related to coordinating communications, such as an indication of time and/or frequency resources related to the scheduling grant, the HARQ communication to be transmitted over the resources, etc. For example, interference management component 926 can utilize the control messages to configure coordinated multiple point (CoMP) communications (e.g., as defined in LTE) among eNB 904 and eNB 952 and/or UE 950 (and/or other eNBs/UEs) to transmit the HARQ communication to the UE 902 from multiple network points over the TTI indicated in the scheduling grant (e.g., over the same or different frequency resources, using the same or different RAT, etc.). Coordinating communications in this regard can ensure that the participating network points (e.g., eNBs and/or UEs) are not interfering (and indeed are assisting) with the HARQ communication from eNB 904 to UE 902. In addition, a higher data rate may be achieved by coordinating the HARQ communications from multiple nodes over one or more carriers in this regard.

Interference management component 926 may transmit the control messages to all eNBs and/or UEs within a proximity of eNB 904, a subset of eNBs and/or UEs within the proximity of eNB 904, etc. For example, interference management component 926 may determine the eNBs and/or UEs estimated to possibly interfere with UE 902 over a threshold level. For example, interference management component 926 may determine the eNBs and/or UEs based at least in part on the one or more interference parameters or predicted interference parameters, which in one example may identify the eNB and/or UE interfering with UE 902 in receiving previous HARQ communications from eNB 904. In another example, interference management component 926 may determine the eNBs and/or UEs based at least in part on interference parameters or predicted interference parameters previously received from UE 902 or other UEs. In another example, interference management component 926 may determined the eNBs and/or UEs based on observing signals transmitted in the frequency band, and determining a source of the signals, etc. In any case, for example, the eNB 952 and/or UE 950 may acknowledge receipt of the control message from eNB 904. In one example, scheduling component 930 may communicate the scheduling grant to UE 902 based on receiving an ACK for the one or more control messages from one or more eNBs and/or UEs to which the control message was communicated. In another example, resource grant generating component 920 may determine a different scheduling grant based on receiving a NACK for one or more of the control messages.

In any case, as described with respect to FIG. 11, the scheduling grant can be transmitted to the UE 902, and the HARQ communication can again be communicated over the scheduling grant (e.g., by eNB 904 and/or by other eNBs and/or UEs in CoMP communications).

Figure 14:
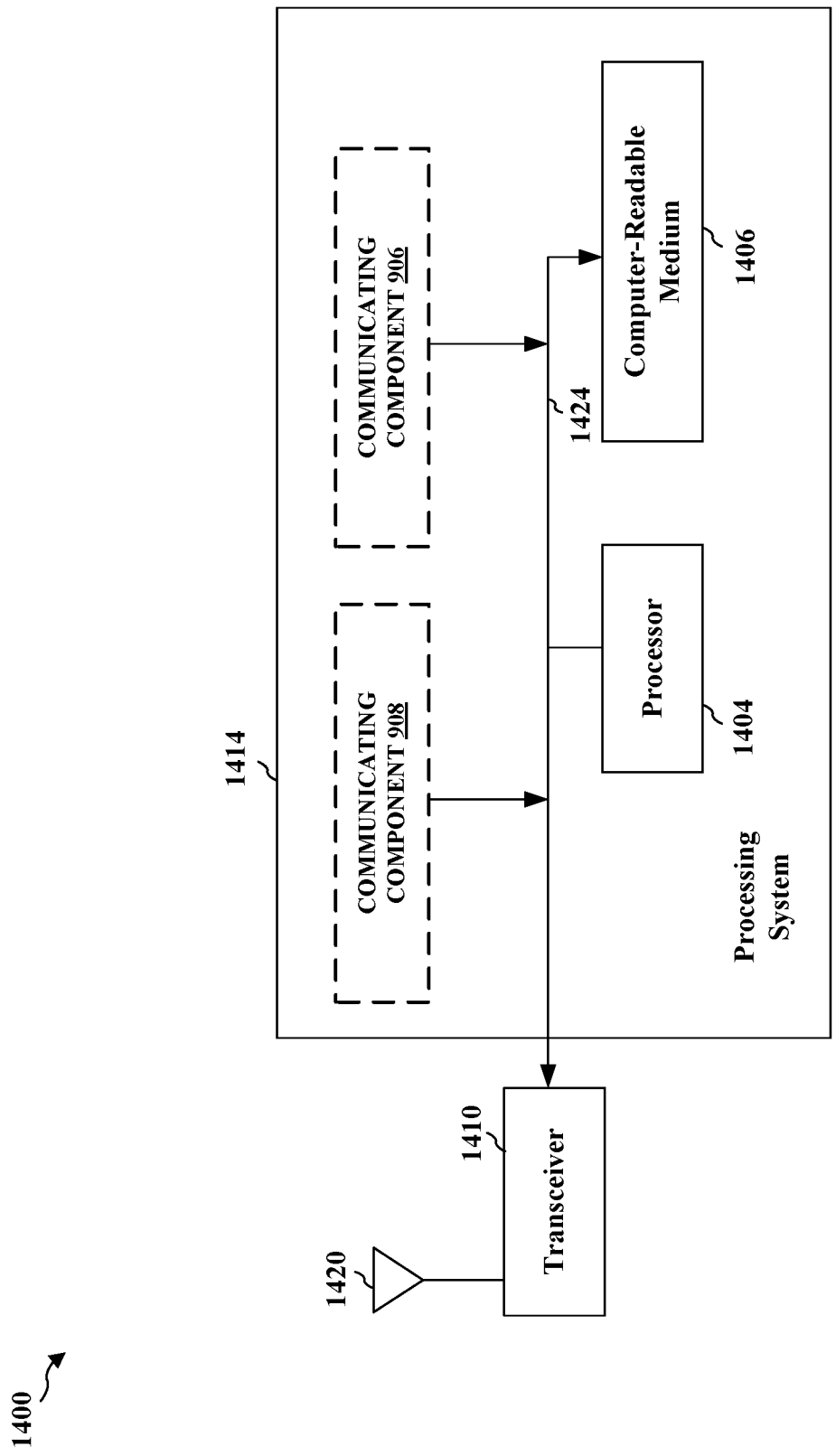
FIG. 14 is a diagram illustrating an example of a hardware implementation for an apparatus employing a processing system.

FIG. 14 is a diagram illustrating an example of a hardware implementation for an apparatus 1400 employing a processing system 1414, which in one aspect of operation with an eNB may include communicating component 906, and which in another aspect of operation with a UE may include communicating component 908. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the communicating component 906 or communicating component 908 (FIG. 9), and/or the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. In addition, the transceiver 1410 may be configured to receive resource grants for transmitting a ULL frame structure and/or user data for transmission to one or more eNBs. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system can further include at least one of communicating component 906 (and/or its related components) and communicating component 908 (and/or its related components) (FIG. 9). The modules/components may be software modules running in the processor 1404, resident/stored in the computer-readable medium 1406, one or more hardware modules coupled to the processor 1404, or some combination thereof. The processing system 1414 may thus be a component of the eNB 510 or UE 550 and may include the memory 576, 560 and/or at least one of the TX processor 516, 568, the RX processor 570, 556, and the controller/processor 575, 559.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for communicating hybrid automatic repeat/request (HARQ) feedback, comprising:
   receiving, from a base station, a first instance of a HARQ communication over a first set of one or more links with the base station based on a first scheduling grant;
   determining, after receiving the first instance of the HARQ communication, one or more interference parameters related to receiving the first instance of the HARQ communication;
   transmitting, to the base station, HARQ feedback for the first instance of the HARQ communication including at least one of HARQ feedback or the one or more interference parameters for one or more of the first set of one or more links;

transmitting, to the base station, an indication of one or more predicted interference parameters predicted for a subsequent time interval for receiving a next instance of the HARQ communication; and receiving, from the base station and in response to transmitting the indication, a scheduling grant for receiving the next instance of the HARQ communication in a subsequent time interval, wherein the scheduling grant indicates a second set of one or more links with the base station over which to receive the next instance of the HARQ communication, wherein the second set of one or more links includes a different number of component carriers than the first set of one or more links.

2. The method of claim 1, further comprising:
determining the one or more predicted interference parameters for a next HARQ communication.

3. The method of claim 2, wherein determining the one or more predicted interference parameters comprises:
determining a temporal interference correlation between interference parameters related to prior HARQ communications and an interference pattern related to the HARQ communication.

4. The method of claim 2, wherein determining the one or more predicted interference parameters comprises:
determining a spectral interference correlation among interference patterns in prior HARQ communications.

5. The method of claim 1, wherein determining the one or more interference parameters comprises:
detecting the one or more interference parameters or control messages of neighboring cells.

6. The method of claim 5, wherein each of the one or more interference parameters correspond to one or more interfering nodes that are detected as transmitting in a similar time period and/or using similar resources as an entity transmitting the HARQ communication.

7. The method of claim 5, wherein determining the one or more interference parameters comprises:
detecting distinct interference parameters of dominant interferers over each link based on measuring pilot signals or control channels from one or more interfering nodes, or detecting periodic null-tones of the one or more interfering nodes for determining one or more interference parameters of the one or more interfering nodes.

8. The method of claim 1, wherein the one or more interference parameters and/or the one or more predicted interference parameters correspond to an index related to an associated interference pattern.

9. The method of claim 1, further comprising:
transmitting a scheduling request for another instance of the HARQ communication based on the one or more interference parameters, or the one or more predicted interference parameters.

10. The method of claim 9, further comprising:
receiving another scheduling grant for the another instance of the HARQ communication over another set of one or more links.

11. The method of claim 1, wherein the HARQ feedback comprises one or more auxiliary acknowledgement (ACK)/non-acknowledgement (NACK) indicators for the first instance of the HARQ communication over the one or more of the first set of one or more links corresponding to one or more interference parameters.

12. An apparatus for communicating hybrid automatic repeat/request (HARQ) feedback, comprising:
a memory; and
at least one processor coupled to the memory, wherein the at least one processor is configured to:
receive, from a base station, a first instance of a HARQ communication over a first set of one or more links with the base station based on a first scheduling grant; and
determine, after receiving the first instance of the HARQ communication, one or more interference parameters related to receiving the first instance of the HARQ communication;
transmit, to the base station, HARQ feedback for the first instance of the HARQ communication including at least one of HARQ feedback or the one or more interference parameters for one or more of the first set of one or more links;
transmit, to the base station, an indication of one or more predicted interference parameters predicted for a subsequent time interval for receiving a next instance of the HARQ communication; and
receive, from the base station and in response to transmitting the indication, a scheduling grant for receiving the next instance of the HARQ communication in a subsequent time interval, wherein the scheduling grant indicates a second set of one or more links with the base station over which to receive the next instance of the HARQ communication, wherein the second set of one or more links includes a different number of component carriers than the first set of one or more links.

13. The apparatus of claim 12, wherein the at least one processor is further configured to:
determine the one or more predicted interference parameters for a next HARQ communication.

14. The apparatus of claim 13, wherein the at least one processor is configured to determine the one or more interference parameters at least in part by:
determining a temporal interference correlation between interference parameters related to prior HARQ communications and an interference pattern related to the HARQ communication.

15. The apparatus of claim 13, wherein the at least one processor is configured to determine the one or more predicted interference parameters at least in part by:
determining a spectral interference correlation among interference patterns in prior HARQ communications.

16. The apparatus of claim 12, wherein the at least one processor is configured to determine the one or more interference parameters at least in part by:
detecting the one or more interference parameters or control messages of neighboring cells.

17. The apparatus of claim 16, wherein each of the one or more interference parameters correspond to one or more interfering nodes that are detected as transmitting in a similar time period and/or using similar resources as an entity transmitting the HARQ communication.

18. The apparatus of claim 16, wherein the at least one processor is configured to determine the one or more predicted interference parameters at least in part by:
detecting distinct interference parameters of dominant interferers over each link based on measuring pilot signals or control channels from one or more interfering nodes, or detecting periodic null-tones of the one or more interfering nodes for determining one or more interference parameters of the one or more interfering nodes.

19. The apparatus of claim 12, wherein the one or more interference parameters and/or the one or more predicted interference parameters correspond to an index related to an associated interference pattern.

20. The apparatus of claim 12, wherein the at least one processor is further configured to:
transmit a scheduling request for another instance of the HARQ communication based on the one or more interference parameters, or the one or more predicted interference parameters.

21. The apparatus of claim 20, wherein the at least one processor is further configured to:
receive another scheduling grant for the another instance of the HARQ communication over another set of one or more links.

22. The apparatus of claim 12, wherein the HARQ feedback comprises one or more auxiliary acknowledgement (ACK)/non-acknowledgement (NACK) indicators for the first instance of the HARQ communication over the one or more of the first set of one or more links corresponding to one or more interference parameters.

23. An apparatus for communicating hybrid automatic repeat/request (HARQ) feedback, comprising:
means for receiving, from a base station, a first instance of a HARQ communication over a first set of one or more links with the base station based on a first scheduling grant;
means for determining, after receiving the first instance of the HARQ communication, one or more interference parameters related to receiving the first instance of the HARQ communication;
means for transmitting, to the base station, HARQ feedback for the first instance of the HARQ communication including at least one of HARQ feedback or the one or more interference parameters for one or more of the first set of one or more links;
means for transmitting, to the base station, an indication of one or more predicted interference parameters predicted for a subsequent time interval for receiving a next instance of the HARQ communication; and
means for receiving, from the base station and in response to transmitting the indication, a scheduling grant for receiving the next instance of the HARQ communication in a subsequent time interval, wherein the scheduling grant indicates a second set of one or more links with the base station over which to receive the next instance of the HARQ communication, wherein the second set of one or more links includes a different number Gct of component carriers than the first set of one or more links.

24. The apparatus of claim 23, further comprising:
means for determining the one or more predicted interference parameters for a next HARQ communication.

25. The apparatus of claim 23, wherein the means for determining the one or more interference parameters detects the one or more interference parameters or control messages of neighboring cells.

26. The apparatus of claim 25, wherein each of the one or more interference parameters correspond to one or more interfering nodes that are detected as transmitting in a similar time period and/or using similar resources as an entity transmitting the HARQ communication.

27. A non-transitory computer-readable storage medium comprising computer-executable code for communicating hybrid automatic repeat/request (HARQ) feedback, the code comprising:
code for receiving, from a base station, a first instance of a HARQ communication over a first set of one or more links with the base station based on a first scheduling grant;
code for determining, after receiving the first instance of the HARQ communication, one or more interference parameters related to receiving the first instance of the HARQ communication;
code for transmitting, to the base station, HARQ feedback for the first instance of the HARQ communication including at least one of HARQ feedback or the one or more interference parameters for one or more of the first set of one or more links;
code for transmitting, to the base station, an indication of one or more predicted interference parameters predicted for a subsequent time interval for receiving a next instance of the HARQ communication; and
code for receiving, from the base station and in response to transmitting the indication, a scheduling grant for receiving the next instance of the HARQ communication in a subsequent time interval, wherein the scheduling grant indicates a second set of one or more links with the base station over which to receive the next instance of the HARQ communication, wherein the second set of one or more links includes a different number set of component carriers than the first set of one or more links.

28. The non-transitory computer-readable storage medium of claim 27, further comprising:
code for determining the one or more predicted interference parameters for a next HARQ communication.

29. The non-transitory computer-readable storage medium of claim 27, wherein the code for determining the one or more interference parameters detects the one or more interference parameters or control messages of neighboring cells.

30. The non-transitory computer-readable storage medium of claim 29, wherein each of the one or more interference parameters correspond to one or more interfering nodes that are detected as transmitting in a similar time period and/or using similar resources as an entity transmitting the HARQ communication.

* * * * *